United States Patent
Kotake et al.

(10) Patent No.: US 7,529,387 B2
(45) Date of Patent: May 5, 2009

(54) PLACEMENT INFORMATION ESTIMATING METHOD AND INFORMATION PROCESSING DEVICE

(75) Inventors: Daisuke Kotake, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 11/126,436

(22) Filed: May 11, 2005

(65) Prior Publication Data
US 2006/0004280 A1 Jan. 5, 2006

(30) Foreign Application Priority Data
May 14, 2004 (JP) .............................. 2004-144782

(51) Int. Cl.
*G06K 9/00* (2006.01)
(52) U.S. Cl. ........................ 382/103; 382/154; 382/287
(58) Field of Classification Search ................ 382/103, 382/287, 154; 345/633; 600/414
See application file for complete search history.

(56) References Cited

U.S. PATENT DOCUMENTS

| | | | | |
|---|---|---|---|---|
| 5,642,442 | A | * | 6/1997 | Morton et al. .............. 382/168 |
| 6,064,749 | A | * | 5/2000 | Hirota et al. ................ 382/103 |
| 6,937,255 | B2 | * | 8/2005 | Fukuda et al. .............. 382/103 |
| 7,084,887 | B1 | * | 8/2006 | Sato et al. ................... 382/154 |
| 7,343,278 | B2 | * | 3/2008 | Billinghurst et al. ........ 382/154 |
| 2004/0080548 | A1 | * | 4/2004 | Daily et al. ................. 345/850 |
| 2004/0258314 | A1 | * | 12/2004 | Hashimoto .................. 382/224 |

FOREIGN PATENT DOCUMENTS

| | | |
|---|---|---|
| JP | 11-84307 A | 3/1999 |
| JP | 2000-41173 A | 2/2000 |
| WO | WO 03034397 A1 * | 4/2003 |
| WO | WO 2004012141 A2 * | 2/2004 |

OTHER PUBLICATIONS

Uchiyama et al., 'MR Platform: A basic body on which mixed reality applications are built', 2002, IEEE Proceedings of the International Symposium on Mixed and Augmented Reality, pp. 246-320.*

(Continued)

*Primary Examiner*—John B Strege
(74) *Attorney, Agent, or Firm*—Canon U.S.A. Inc., I.P. Division

(57) ABSTRACT

A method is provided for estimating the placement information of a plurality of types of markers of which the amounts of the placement information differ respectively, detects a plurality of types of markers from multiple images, calculates the position where the detected marker is projected on an image surface based on the approximate values of the positions and orientations of an imaging device when multiple images are photographed, obtains the correction value of the placement information of a marker so as to reduce a sum of error between the position of the detected marker on the image surface and the projected position of the marker calculated, corrects the placement information of the marker, and also calculates the placement information of a plurality of types of markers by repeating these processes.

11 Claims, 11 Drawing Sheets

OTHER PUBLICATIONS

Satoh et al., 'Robust Vision-Based Registration Utilizing Bird's-Eye View with User's View', 2003, The second IEEE and ACM International Symposium on Mixed and Augmented Reality, pp. 46-55.*

Haralick, et al., "Review and analysis of solutions of the three point perspective . . . ", Int'l. J. Computer Vision, vol. 13, No. 3, pp. 331-356, 1994.

Fischler, et al., "Random sample consensus: a paradigm for model fitting with applications to image analysis . . . ", Comm. ACM, vol. 24, No. 6, pp. 381-395, 1981.

J. Rekimoto, "Configuration method of augmented reality using 2-D matrix code", Interactive System and Software IV, Kindai Kagakusha, 1996.

Kato, M. Billinghurst, et al., "Augmented reality based on marker tracing and calibration thereof", Japan Virtual Reality Academic Journal, vol. 4, No. 4, pp. 607-616, 1999.

A. State, et al., "Superior augmented reality registration by integrating Landmark tracking and magnetic tracking", Proc. SIGGRAPH'96, pp. 429-438, 1996.

G. Baratoff, et al., "Interactive multi-marker calibration for augmented reality applications", Proc. ISMAR2002, pp. 107-116, 2002.

H. Kato, et al., "Virtual object manipulation on a table-top AR environment", Proc. ISAR2000, pp. 111-119, 2000.

Kotake D. et al: "A Marker Calibration Method Utilizing A Prior Knowledge on Marker Arrangement" Mixed And Augmented Reality, 2004. ISMAR 2004. Third IEEE and ACM International Symposium on Arlington VA, Nov. 2, 2004, pp. 89-98, Piscataway, NJ, USA.

Baratoff, G. et al: "Interatcative multi-marker calibration for augmented reality applications" Mixed and Augmented Reality, 2002. ISMAR 2002. Proceedings. International Symposium. Sep. 30, 2002, pp. 107-116, Piscataway, NJ, USA.

Szelinski, Kang: "Recovering 3D shape and motion from image streams using non-linear least squares" Digital Equipment Corporation, Cambridge Research Lab, Mar. 2003, pp. 6-9.

Hartley, Zissermann: "Multiple View Geometry", Chapter 18, "N-View Computational Methods," Cambridge University Press, 2003, pp. 434-435.

Kato H, et al: "Virtual object manipulation on a table-top AR environment" Augmented Reality, 2000. ISAR 2000. IEEE and ACM International Symposium on Munich, Germany, Oct. 5, 2000, pp. 111-119.

Liu et al: "Maker Orientation in Fiducial Registration" Progress in Biomedical Optics and Imaginng SPIE, vol. 5032, 2003, pp. 1176-1185, Bellingham, WA, USA.

Habib, et al: "Bundle Adjustment with Self-Calbration Using Straight Lines" Photogrammetric Record, Blackwell Publishing, vol. 17 No. 100, 2002, pp. 635-650, Oxford, GB.

Cornou S. et al: "Architectural Reconstruction with Mulitple Views and Geometric Constraints" Proceedings of the British Machine Vision Conferences, Sep. 8, 2003, pp. 1-10, GB.

* cited by examiner

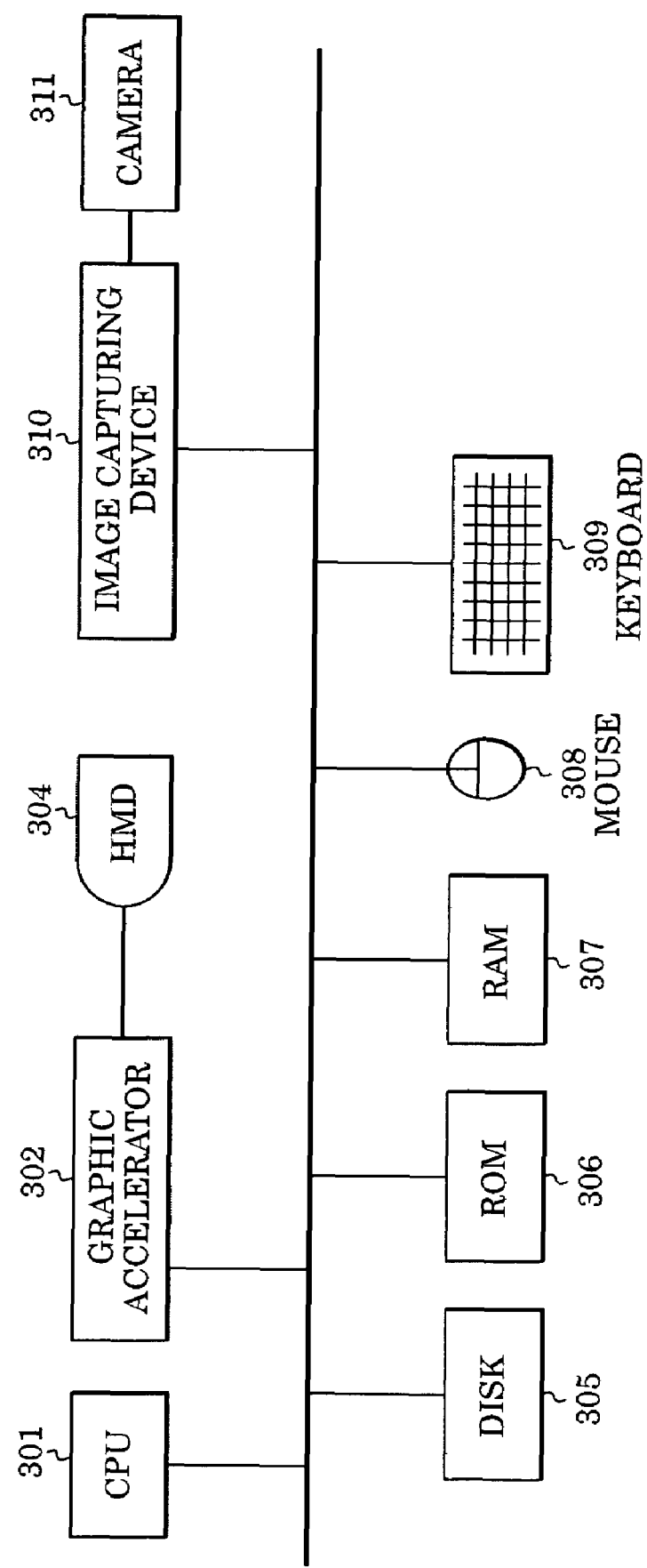

CENTER OF GRAVITY OF
POINT MARKER
(POSITION OF POINT MARKER)

POINT
MARKER

PLANE MARKER

POSITION OF
PLANE MARKER

MARKER POSITION

MARKER POSITION

MARKER ORIENTATION

MARKER POSITION

MARKER ORIENTATION

MARKER POSITION

POSITION-AND-ORIENTATION
DATA FILE

PLACEMENT INFORMATION ESTIMATING METHOD AND INFORMATION PROCESSING DEVICE

BACKGROUND OF THE INVENTION

1. Field of the Invention

The present invention relates to a method for estimating the placement information of markers disposed within a 3-D space.

2. Description of the Related Art

In recent years, studies regarding MR (Mixed Reality) technology have been actively pursued. The MR technology is used for seamlessly integrating real space with virtual space created by a computer. Of the MR technology, AR (Augmented Reality; also referred to as enhanced reality) technology which superimposes virtual space over real space has particularly attracted attention.

An image display device on which the AR technology displays an image is realized by a video see-through method which displays a synthesized image obtained by superimposing a computer-generated image concerned with virtual space (a virtual object, character information, or the like, drawn with computer graphics) rendered according to the position and orientation of a later-described imaging device over an image of real space photographed using an imaging device such as a video camera, or by an optical see-through method which displays an image of virtual space rendered according to an observer's viewing position and orientation on an optical-see-through-type display mounted on the observer's head.

There are expectations for application of the AR technology to various fields such as surgical aids which superimposes the state within a patient's body over the surface of the body, an architectural simulation which superimposes a virtual building over an image of vacant land, assembly aids which superimposes assembly procedures and wiring for assembly of machines or other devices, and the like.

The most important problem to be solved in the AR technology is how to accurately perform the registration between real space and virtual space, and heretofore, many methods have been attempted. The registration problem in the AR technology corresponds to a problem of obtaining the position and orientation of an imaging device in a scene (i.e., in the reference coordinate system) in the case of the video see-through method. Similarly, in the case of the optical see-through method, the registration problem corresponds to a problem for obtaining the position and orientation of an observer or a display device in the scene.

A commonly-employed method for solving the former problem is to dispose artificial markers or make natural characteristic points markers in the scene, based on the correspondence between the projected positions of the markers within an image photographed by an imaging device and the positions in the reference coordinate system of the marker so as to obtain the position and orientation of the imaging device in the reference coordinate system. Also, a commonly-employed method for solving the latter problem is to mount the imaging device on a target to be measured (e.g., an observer's head or display), with the position and orientation of the imaging device being obtained in the same way as with the former method, and the position and orientation of the target to be measured is obtained based thereupon.

Description will be made regarding a conventional example of a position-and-orientation measuring device for measuring the position and orientation of a later-described imaging device by correlating the 2-D coordinates of a marker to be detected from an image photographed by an imaging device and the 3-D position of the marker in the reference coordinate system with reference to FIG. 1. As illustrated in FIG. 1, a position-orientation measuring device 100 in the present conventional example includes a marker detecting unit 110 and position-orientation calculating unit 120, and is connected to an imaging device 130.

Also, K markers $Q_k$ (k=1, 2, and so on through K) of which the positions in the reference coordinate system are known are disposed in real space as the markers for obtaining the position and orientation of the imaging device 130. The example in FIG. 1 illustrates a situation in which four markers $Q_1$, $Q_2$, $Q_3$, and $Q_4$ are disposed. Of these, three markers $Q_1$, $Q_3$, and $Q_4$ are inside the field of view of the imaging device 130 and one marker $Q_2$ is outside the field of view of the imaging device 130.

The markers $Q_k$ can be any shape, such as a circular marker having a different color from other markers, or the like, as long as the projected position of a marker within a photographed image can be detected, and also the marker can be identified. For example, natural characteristic points within 3-D space may be employed, and such points may be detected within a photographed image using template matching. An image output from the imaging device 130 is input to the position-orientation measuring device 100. The marker detecting unit 110 inputs an image by the imaging device 130, and detects the image coordinates of the markers $Q_k$ photographed on the image. For example, in the event that each of the markers $Q_k$ is made up of a circular marker each having a different color, the marker detecting unit 110 detects a region corresponding to each marker color from on the input image, and takes the barycentric position as the detected coordinates of the marker.

Further, the marker detecting unit 110 outputs the image coordinates $u^{Mk_n}$ of each detected marker $Q_{k_n}$ and the identifier $k_n$ thereof to the position-orientation calculating unit 120. Here, n (=1, 2, and so on through N) is a symbol representing the serial number of the detected markers, and N represents the total number of the detected markers. For example, in the case of FIG. 1, N=3, so the identifiers $k_1$=1, $k_2$=3, $k_3$=4 and the image coordinates $u^{Mk_1}$, $u^{Mk_2}$, and $u^{Mk_3}$ corresponding to these are output.

The position-orientation calculating unit 120 calculates the position and orientation of the imaging device 130 based on the correlation between the image coordinates $u^{Mk_n}$ of each detected marker $Q_{k_n}$ and the position in the reference coordinate system of the marker $Q_{k_n}$, which is held as known information beforehand. A method for calculating the position and orientation of an imaging device based on a pair of the 3-D coordinates of a marker and image coordinates has been proposed in the field of photogrammetry as of old (for example, see R. M. Haralick, C. Lee, K. Ottenberg, and M. Nolle: "Review and analysis of solutions of the three point perspective pose estimation problem", Int'l. J. Computer Vision, vol. 13, no. 3, pp. 331-356, 1994 and M. A. Fischler and R. C. Bolles: "Random sample consensus: a paradigm for model fitting with applications to image analysis and automated cartography", Comm. ACM, vol. 24, no. 6, pp. 381-395, 1981). The position-orientation calculating unit 120 calculates the position and orientation of the imaging device 130 using the method described in R. M. Haralick, C. Lee, K. Ottenberg, and M. Nolle: "Review and analysis of solutions of the three point perspective pose estimation problem", Int'l. J. Computer Vision, vol. 13, no. 3, pp. 331-356, 1994, for example.

Note that description has been made regarding the case of employing markers (hereinafter, referred to as "point markers") as multiple points within 3-D space, but a calculation method for calculating the position and orientation of an imaging device using square-shaped markers (hereinafter, referred to as "square markers") having a known size has been proposed as disclosed in J. Rekimoto: "Configuration method of augmented reality using 2-D matrix code", Interactive System and Software IV, Kindai Kagakusha, 1996 and Kato, M. Billinghurst, Asano and Tachibana: "Augmented reality based on marker tracing and calibration thereof", Japan Virtual Reality Academic Journal, vol. 4, no. 4, pp. 607-616, 1999, for example. A calculation method of the position and orientation of an imaging device using combination of square markers and point markers has been proposed, as disclosed in H. Kato, M. Billinghurst, I. Poupyrev, K. Imamoto and K. Tachibana: "Virtual object manipulation on a table-top AR environment", Proc. ISAR2000, pp. 111-119, 2000, for example. With this calculation method, point markers have an advantage wherein point markers can set even in a narrow place, square markers have advantages wherein identification is easy, and the position and orientation of the imaging device can be obtained from only one marker since one marker includes sufficient information, thus utilizing these two types of markers in a complementary manner.

According to the aforementioned methods, based on an image photographed by an imaging device, the position and orientation of the imaging device has been acquired since the past.

On the other hand, an arrangement has been made in which a 6-degree-of-freedom position and orientation sensor such as a magnetic sensor, ultrasonic sensor, or the like is attached to an imaging device serving as a target to be measured, and the position and orientation the imaging device is measured by concomitant use with marker detection by image processing as described above, as disclosed in Japanese Patent Laid-Open No. 11-084307, Japanese Patent Laid-Open No. 2000-041173, and A. State, G. Hirota, D. T. Chen, W. F. Garrett and M. A. Livingston: "Superior augmented reality registration by integrating landmark tracking and magnetic tracking", Proc. SIGGRAPH'96, pp. 429-438, 1996. The accuracy of a sensor output changes depending on a measuring range, but can be obtained robustly, so a method using both sensor and image processing can improve robustness as compared with a method using image processing alone.

With a registration method using markers, the position in the reference coordinate system in the case of point markers and the position and orientation in the reference coordinate system in the case of square markers needs to be known for obtaining the position and orientation in the reference coordinate system of an imaging device serving as a target to be measured. In the case of a square marker, the square marker itself is often taken as the reference of the coordinate system without separately providing the reference coordinate system, but in the case of employing multiple square markers, the mutual position and orientation relations need to be known, and accordingly, there is no difference in that the reference coordinate system needs to be employed.

The position and orientation of a marker may be measured by hand using a measuring tape, ruler, or protractor, or by a surveying instrument, but measurement techniques utilizing images have been performed to improve accuracy and save time. The position of a point marker can be measured by a method called the bundle adjustment method. The bundle adjustment method is a method in which a great number of point markers are photographed by an imaging device, the position and orientation of the imaging device taking each image and the positions of point markers are obtained by repeated calculation so that the error between the projected positions where the markers are actually observed on the image, and the projected positions to be calculated from the position and orientation of the imaging device, and the positions of the markers, can be minimized.

Also, a method for measuring the position and orientation of multiple square markers disposed within 3-D space has been disclosed in G. Baratoff, A. Neubeck and H. Regenbrecht: "Interactive multi-marker calibration for augmented reality applications", Proc. ISMAR2002, pp. 107-116, 2002. With G. Baratoff, A. Neubeck and H. Regenbrecht: "Interactive multi-marker calibration for augmented reality applications", Proc. ISMAR2002, pp. 107-116, 2002, the position and orientation of an imaging device taking each image, and the position and orientation of each square marker are obtained using a method in which a great number of images of multiple square markers disposed within 3-D space are photographed, and repeated calculation is performed so that projection error can be minimized.

With the aforementioned conventional methods for measuring the position and orientation of a marker, the position of a point marker, and the position and orientation of a "planar" marker such as a square marker cannot be obtained simultaneously. More specifically, the placement information of multiple types of markers, of which the placement information has different amounts of information, such as a marker (point marker, for example) having placement information, i.e., the position of one point within 3-D space, a marker (plane marker, for example) having placement information, i.e., the position and orientation within 3-D space, and the like, cannot be obtained simultaneously. Consequently, the placement information of markers such as the position of point markers, the positions and orientations of plane markers, and the like need to be obtained independently for each type of markers. Accordingly, even if different types of marker (point marker and plane marker, for example) had been photographed on the same image, the placement information of each type of marker, and the position and orientation of an imaging device so as to minimize the projection error cannot be obtained, so the placement information of the markers cannot be obtained accurately.

SUMMARY OF THE INVENTION

The present invention has been made in light of the aforementioned problems, and provides a method for obtaining the placement information of various types of markers accurately by photographing scenes including markers using an imaging device and obtaining the placement information of multiple types of markers, of which the placement information has different amounts of information, simultaneously.

Also, the present invention provides a method for obtaining the placement information of various types of markers accurately by photographing scenes including markers, using an imaging device, and repeatedly obtaining the placement information of multiple types of markers, of which the placement information has different amount of information, in an alternating manner.

To this end, according to a first aspect of the present invention, a marker placement information estimating method for estimating the placement information of a plurality of types of markers, of which the placement information has different amounts of information, includes: a marker detecting step for detecting a plurality of types of markers from a plurality of images in which scenes including markers are photographed; a marker projected position calculating step for calculating the projected position where a marker is projected on an image surface based on the approximate value of the position and orientation of an imaging unit when the plurality of images were photographed and the approximate value of the placement information of each type of marker; a correction value calculating step for obtaining a correction value as to the placement information of each type of marker so as to reduce a sum of error between the position of each type of marker on the image surface detected in the marker detecting step and the projected position of the marker on the image surface obtained in the marker projected position calculating step; a placement information correcting step for correcting the placement of each type of marker based on the correction value obtained in the correction value calculating step; and a repeated calculating step for calculating the placement information of each type of marker by repeatedly performing the marker projected position calculating step, the correction value calculating step, and the placement information correcting step using the placement information of the marker corrected in the placement information correcting step instead of the approximate value in the marker projected position calculating step.

According to a second aspect of the present invention, a marker placement information estimating method for estimating the placement information of a plurality of types of markers, of which the placement information has different amounts of information, includes: a marker detecting step for detecting a plurality of types of markers from a plurality of images in which scenes including markers are photographed; a marker type selecting step for selecting one or more types of marker from the plurality of types of markers; a marker projected position calculating step for calculating the projected position where a marker is projected on an image surface based on the approximate value of the position and orientation of an imaging unit when the plurality of images were photographed and the approximate value of the placement information of the marker having the type selected in the marker type selecting step; a placement information correcting step for obtaining the placement information of the selected types of marker so as to reduce a sum of error between the position on the image surface of the marker, which has been detected in the marker detecting step, having the type selected in the marker type selecting step and the projected position on the image surface of the marker obtained in the marker projected position calculating step, and correcting the placement information; a first repeated calculating step for calculating the placement information of the marker corrected in the placement information correcting step by repeatedly performing the marker projected position calculating step and the placement information correcting step using the placement information of the marker corrected in the placement information correcting step instead of the approximate value in the marker projected position calculating step; and a second repeated calculating step for selecting one or more markers having the type not selected in the marker type selecting step again, and repeatedly performing the marker projected position calculating step, the placement information correcting step, and the first repeated calculating step.

According to the first aspect of the present invention, the placement information of various types of markers can be obtained accurately by photographing scenes including markers using an imaging device and obtaining the placement information of multiple types of markers, of which the placement information has different amounts of information, simultaneously.

Also, according to the second aspect of the present invention, the placement information of various types of markers can be obtained accurately by giving heavier weight to markers having higher reliability of detected results from an image to obtain the placement information.

Also, according to a third aspect of the present invention, the placement information of various types of markers can be obtained accurately by photographing scenes including markers using an imaging device and repeatedly obtaining the placement information of multiple types of markers, of which the placement information has different amounts of information, one after the other.

Other features and advantages of the present invention will be apparent from the following description exemplary embodiments taken in conjunction with the accompanying drawings, in which like reference characters designate the same or similar parts throughout the figures thereof.

BRIEF DESCRIPTION OF THE DRAWINGS

FIG. 3 is a block diagram illustrating the hardware configuration of the marker position-and-orientation estimating device according to the first embodiment.

DESCRIPTION OF THE EMBODIMENTS

Description is made below regarding exemplary embodiments of the present invention with reference to the appended drawings.

First Embodiment

Figure 1:
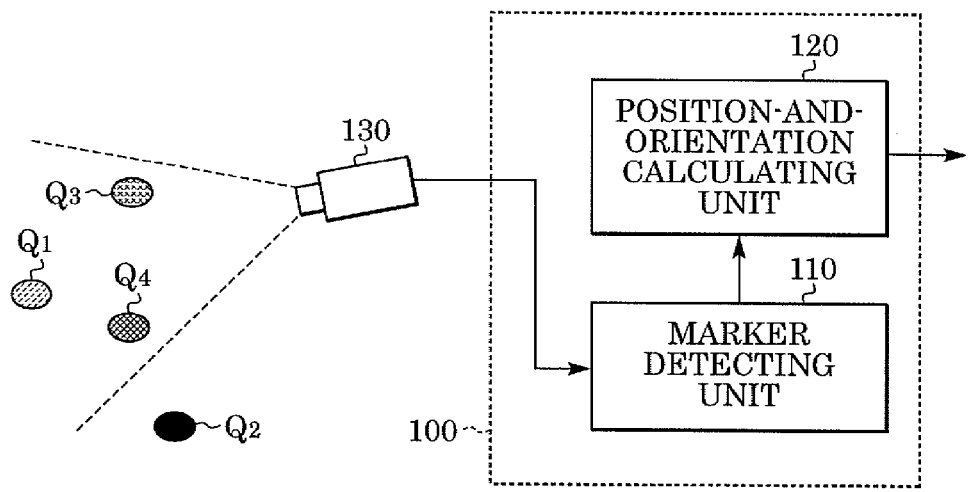
FIG. 1 is a diagram illustrating a conventional position-and-orientation measuring device.
Figure 2:
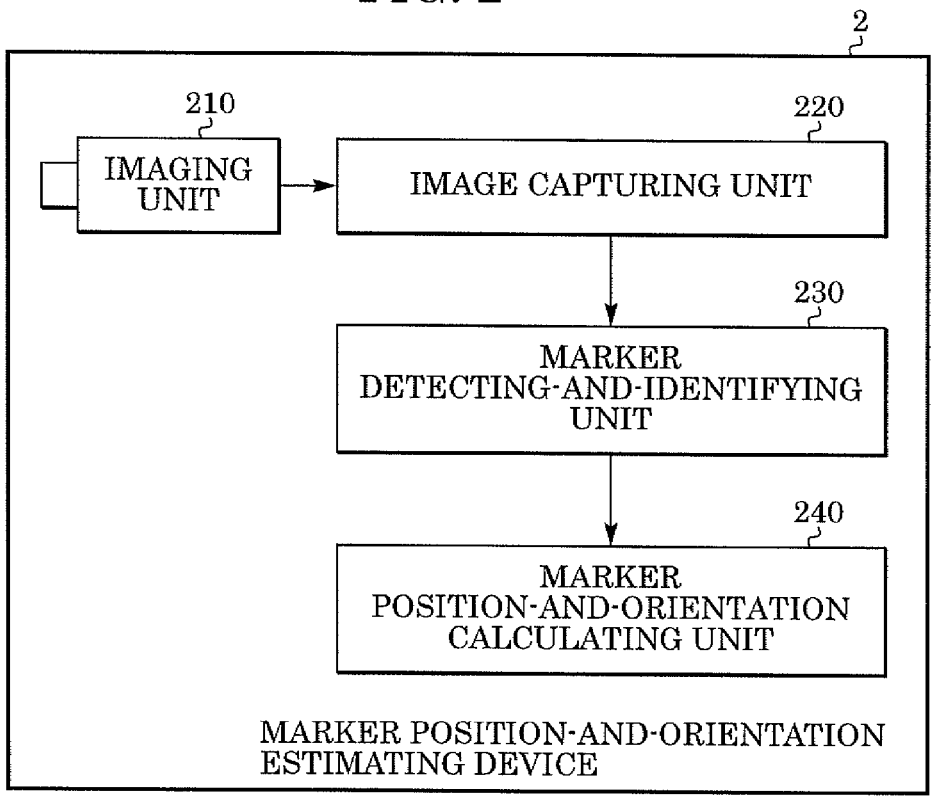
FIG. 2 is a block diagram illustrating the functional configuration of a marker position-and-orientation estimating device according to a first embodiment.

FIG. 2 is a block diagram illustrating the functional configuration of a marker position-and-orientation estimating device 2 according to the present embodiment. An imaging unit 210 is a camera, which photographs a scene in which markers are disposed. An image capturing unit 220 inputs an image photographed by the imaging unit 210 to a computer. A marker detecting-and-identifying unit 230 detects markers from the image input to the computer from the image capturing unit 220, and identifies each detected marker. A marker position-and-orientation calculating unit 240 calculates the position and orientation of each marker based on the marker detection results of the marker detecting-and-identifying unit 230.

FIG. 3 is a block diagram illustrating the hardware configuration of the marker position-and-orientation estimating device 2 according to the present embodiment. The hardware configuration illustrated in FIG. 3 is the same configuration as that of a common personal computer, but is further connected with an image capturing device 310 and a camera 311. The image capturing device 310 is for inputting an image photographed by the camera 311 to the computer, and corresponds to the image capturing unit 220. An example of the image capturing device 310 is a video capturing board, but is not restricted to this as long as an image photographed by a camera can be input. A CPU 301 serves as the marker detecting-and-identifying unit 230, and marker position-and-orientation calculating unit 240 by executing a program stored in an unshown optical medium, external storage device, or the like.

The hardware configuration of the marker position-and-orientation estimating device 2 shown in FIG. 3 may also include other conventional computer components, such as a graphic accelerator 302 in communication with a head-mounted display (HMD) 304, a storage device, such as a disk 305, a read-only memory (ROM) 306, a random access memory (RAM) 307, and one or more input devices, such as a keyboard 309 and a mouse 308.

Next, description is made regarding the overview of operation of the marker position-and-orientation estimating device 2 according to the present embodiment having the aforementioned configuration.

Figure 4A:
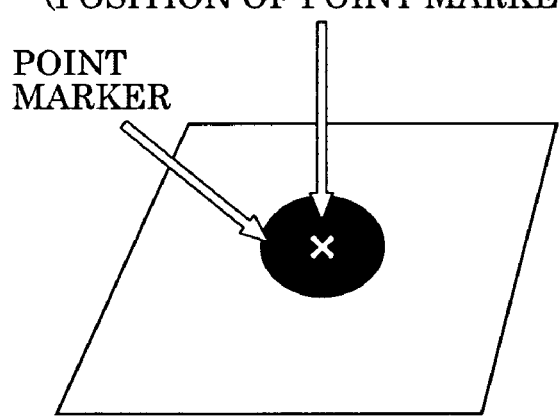
FIG. 4A is diagram illustrating a point marker employed in the first embodiment.
Figure 4B:
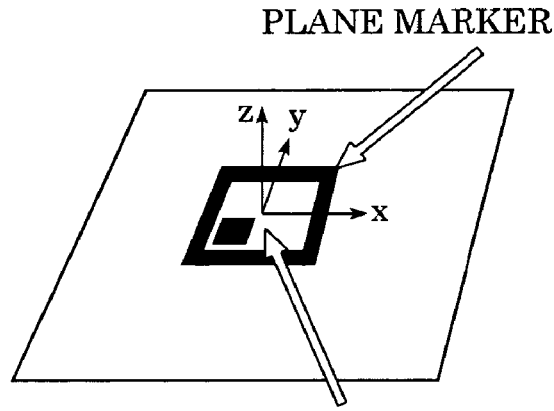
FIG. 4B is a diagram illustrating a plane marker employed in the first embodiment.

First, description is made regarding markers to be employed with the present embodiment. FIGS. 4A and 4B are diagrams illustrating markers to be employed with the present embodiment. FIG. 4A illustrates a point marker in which the placement information is represented by the position of a point in 3-D space. Let us say that point markers have a circular shape having a single color so as to be detected within an image, and the center of gravity of each point marker represents the position thereof in 3-D space. FIG. 4B illustrates a plane marker of which the placement information is represented by the position and orientation of a plane in 3-D space. The present embodiment employs square markers as plane markers, but plane markers are not restricted to square markers, and any shaped markers may be employed as long as markers have a form of a planar shape. Let us say that the center of a square, i.e., the intersecting point of two diagonal lines, represents the position of a square marker in 3-D space. As illustrated in FIG. 4B, let us say that the normal line direction of the square marker is taken as the z axis, the coordinate system of the square marker is assigned so that the x axis and y axis can be parallel to the two sides, and the orientation of the coordinate system of the square marker to the reference coordinate system is taken as the orientation of the square marker. The square markers according to the present embodiment are surrounded with a black frame so as to be easily detected on an image, so a square within the black frame is taken as a square marker.

(1. Photographing of Markers)

A user photographs many images of a scene in which markers are disposed using the imaging unit 210. The photographed images are input to the computer by the image capturing unit 220.

(2. Detection and Identification of Markers)

The marker detecting-and-identifying unit 230 detects markers from the photographed images input to the computer, and performs identification thereof. Here, the term "detection of a marker" means to obtain the image coordinates of a marker on a 2-D image. In the case of point markers, the image coordinates of the center of gravity on an image are obtained, and, in the case of square markers, the image coordinates of each vertex are obtained. The image coordinates of a marker may be obtained automatically, or may be manually specified, for example, by the user clicking on the image with a mouse. In the case of obtaining the position of a point marker automatically, for example, a pixel having the same color as a marker is extracted based on whether or not the pixel belongs to the specific region of a YUV color space image corresponding to the color, a marker region is obtained by labeling the pixels connected as the same color, and the center of gravity of the marker region within the image is calculated. Also, in the case of obtaining the position of each vertex of a square marker automatically, for example, an input image is converted into binarized image, the black frame region of a square marker is detected, and a quadrangle inscribing the black frame region is obtained.

The term "identification of a marker" means to identify a marker to be detected within an image as a unique marker. Identification of a marker may be performed automatically, or may be performed manually by the user. In the case of identifying a point marker automatically, for example, multiple markers having different colors are employed, and identification is performed based on the labeling color of the marker region at the time of detection of markers. Also, in the case of identifying a square marker automatically, for example, identification is performed by giving a unique pattern to each marker.

(3. Calculation of the Position and Orientation of a Marker)

Figure 5:
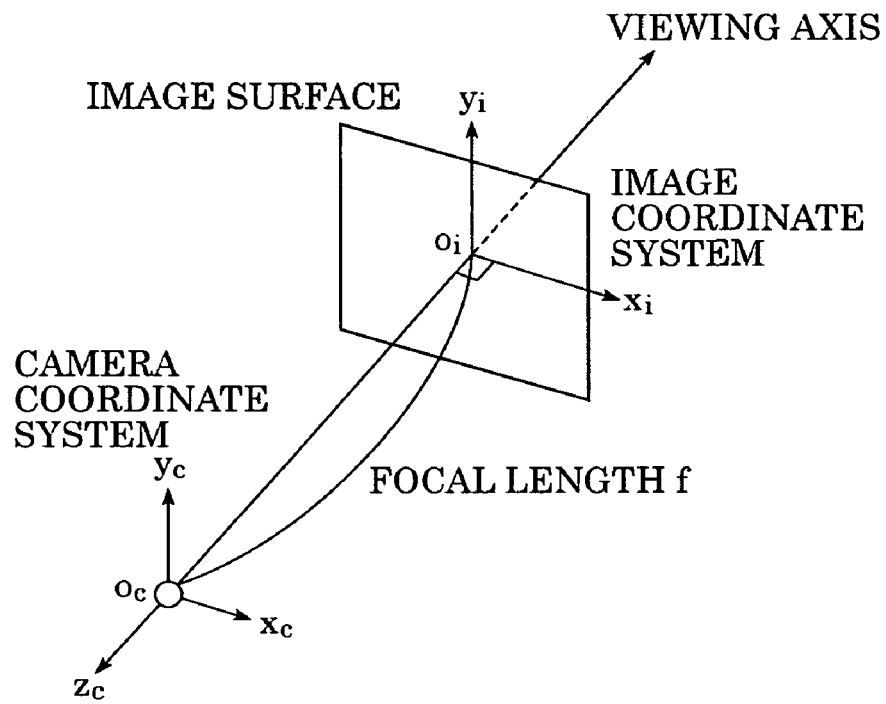
FIG. 5 is a diagram illustrating a camera coordinate system and an image coordinate system.

The position and orientation of a marker in the reference coordinate system is calculated based on the detection and identification results of the marker. First, description is made regarding perspective projection transform. FIG. 5 is a diagram illustrating the camera coordinate system and the image coordinate system. Let us say that the intersecting point between the viewing axis and an image surface is taken as the origin $O_i$ of the image coordinate system, the horizontal direction of an image is taken as the $x_i$ axis, and the vertical direction of the image is taken as the $y_i$ axis. Also, let us say that the focal length between the origin $O_c$ of the camera coordinate system and the image surface is f, the $z_c$ axis of the camera coordinate system is taken in the opposite direction of the viewing axis, the $x_c$ axis is taken in the direction in parallel with the horizontal direction of the image, and the $y_c$ axis is taken in the direction in parallel with the vertical direction of the image.

According to perspective projection transform, the point $x_c = [x_c \, y_c \, z_c]^t$ on the camera coordinate system is projected on a point of which the image coordinates are $u = [u_x \, u_y]^t$ as shown in Expression (2).

$$u_x = -f \frac{x_c}{z_c} \quad (2)$$
$$u_y = -f \frac{y_c}{z_c}$$

Figure 6:
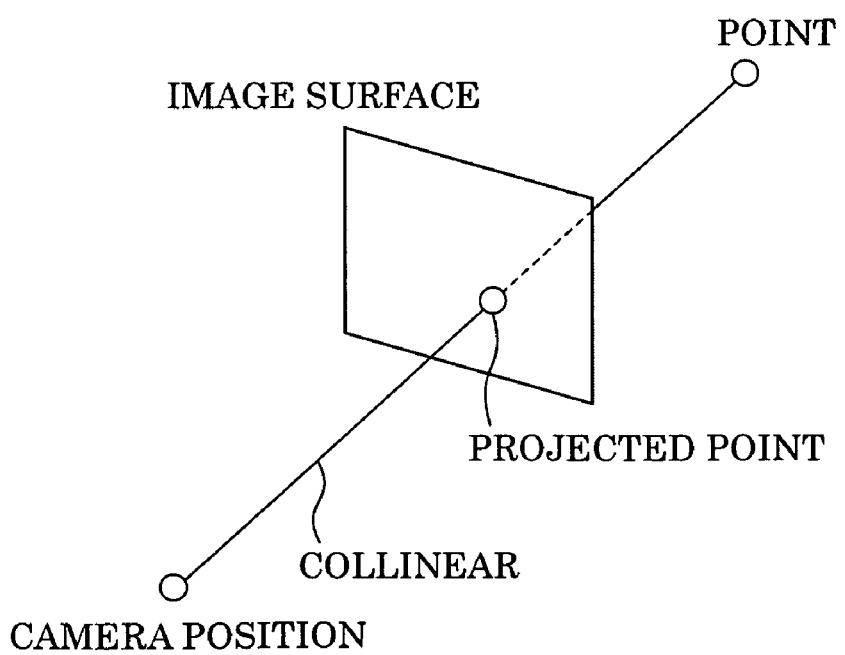
FIG. 6 is a diagram illustrating a collinear condition equation.

With the present embodiment, let us say that lens distortion does not exist, or has been corrected, and the camera is a pin-hole camera. As illustrated in FIG. 6, Expression 2 represents that a point in space, the projected point of the point on an image, and a camera position (viewing position) exist on the same straight line, and is also referred to as a collinear condition.

In the reference coordinate system, let us say that the camera position is $t=[t_x\ t_y\ t_z]^t$, and camera orientation (the orientation of the reference coordinate system to the camera coordinate system, in reality) is $\omega=[\omega_x\ \omega_y\ \omega_z]$. Note that $\omega$ is a 3-degree-of-freedom orientation expression, and orientation is represented with a rotation axial vector and rotation angle. If the rotation angle is $r_a$, then $r_a$ is represented with $\omega$ as shown in Expression (3).

$$r_a = \sqrt{\omega_x^2 + \omega_y^2 + \omega_z^2} \quad (3)$$

Also, if the rotation axial vector is $r=[r_x\ r_y\ r_z]^t$, the relationship between $r$ and $\omega$ is represented as shown in Expression (4).

$$[\omega_x\ \omega_y\ \omega_z] = [r_a r_x\ r_a r_y\ r_a r_z] \quad (4)$$

The relationship between $\omega$ (rotation angle $r_a$ and rotation axial vector r) and 3×3 rotational transform matrix R is represented as shown in Expression (5).

$$R = \begin{bmatrix} R_{11} & R_{12} & R_{13} \\ R_{21} & R_{22} & R_{23} \\ R_{31} & R_{32} & R_{33} \end{bmatrix}$$

$$= \begin{bmatrix} r_x^2(1-\cos r_a)+\cos r_a & r_x r_y(1-\cos r_a)-r_z \sin r_a & r_z r_x(1-\cos r_a)+r_y \sin r_a \\ r_x r_y(1-\cos r_a)+r_z \sin r_a & r_y^2(1-\cos r_a)+\cos r_a & r_y r_z(1-\cos r_a)-r_x \sin r_a \\ r_z r_x(1-\cos r_a)-r_y \sin r_a & r_y r_z(1-\cos r_a)+r_x \sin r_a & r_z^2(1-\cos r_a)+\cos r_a \end{bmatrix} \quad (5)$$

The camera coordinate $x_c$ of a point $x_w=[x_w\ y_w\ z_w]^t$ on the reference coordinate system is represented with t and R as shown in Expression (6).

$$\begin{bmatrix} x_c \\ y_c \\ z_c \end{bmatrix} = R \begin{bmatrix} x_w - t_x \\ y_w - t_y \\ z_w - t_z \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} x_w - t_x \\ y_w - t_y \\ z_w - t_z \end{bmatrix} \quad (6)$$

According to Expressions (2) and (6), i.e., perspective projection transform, the point $x_w=[x_w\ y_w\ z_w]^t$ on the reference coordinate system is projected on the point $u=[u_x\ u_y]^t$ on the image as shown in Expression (7).

$$u_x - f\frac{x_c}{z_c} = -f\frac{R_{11}(x_w-t_x)+R_{12}(y_w-t_y)+R_{13}(z_w-t_z)}{R_{31}(x_w-t_x)+R_{32}(y_w-t_y)+R_{33}(z_w-t_z)} \quad (7)$$

$$u_y = -f\frac{y_c}{z_c} = -f\frac{R_{21}(x_w-t_x)+R_{22}(y_w-t_y)+R_{23}(z_w-t_z)}{R_{31}(x_w-t_x)+R_{32}(y_w-t_y)+R_{33}(z_w-t_z)}$$

Ideally, the projected position (calculated position) calculated from Expression (7) based on t, $\omega$, xw is identical to the position (observation position) to be observed. Accordingly, if we say that the error between the projected position and the observation position in the horizontal direction of the image is F, the error in the vertical direction is G, and the observation position is $u_o=[u_{ox}\ u_{oy}]^t$, F and G become zero as shown in Expression (8).

$$F = -f\frac{R_{11}(x_w-t_x)+R_{12}(y_w-t_y)+R_{13}(z_w-t_z)}{R_{31}(x_w-t_x)+R_{32}(y_w-t_y)+R_{33}(z_w-t_z)} - u_{ox} = 0 \quad (8)$$

$$G = -f\frac{R_{21}(x_w-t_x)+R_{22}(y_w-t_y)+R_{23}(z_w-t_z)}{R_{31}(x_w-t_x)+R_{32}(y_w-t_y)+R_{33}(z_w-t_z)} - u_{oy} = 0$$

F and G are functions regarding the camera position t, camera orientation $\omega$, and position $x_w$ of the observation target point on the reference coordinate system. In the event that a subject to be observed is a point marker, as shown in Expression (9), F and G become functions regarding the camera position t, camera orientation $\omega$, and position $x_w$ of a point marker on the reference coordinate system.

$$F(t_x, t_y, t_z, \omega_x, \omega_y, \omega_z, x_w, y_w, z_w) = 0$$

$$G(t_x, t_y, t_z, \omega_x, \omega_y, \omega_z, x_w, y_w, z_w) = 0 \quad (9)$$

On the other hand, square markers are represented with the position $t_m=[t_{mx}\ t_{my}\ t_{mz}]^t$ in the reference coordinate system and the orientation $\omega_m=[\omega_{mx}\ \omega_{my}\ \omega_{mz}]$ as to the reference coordinate system (let us say that 3×3 rotational transform matrix corresponding to $\omega_m$ is $R_m$). Let us say that the position of vertices of a square marker in the square marker coordinate system is $x_m=[x_m\ y_m\ 0]^t$. The position $x_w$ of the vertices of a square marker in the reference coordinate system become a function regarding $t_m$ and $\omega_m$ ($R_m$) as shown in Expression (10).

$$\begin{bmatrix} x_w \\ y_w \\ z_w \\ 1 \end{bmatrix} = \begin{bmatrix} R_m & t_m \\ 0 & 1 \end{bmatrix} \begin{bmatrix} x_m \\ y_m \\ 0 \\ 1 \end{bmatrix} = \begin{bmatrix} R_{m11} & R_{m12} & R_{m13} & t_{mx} \\ R_{m21} & R_{m22} & R_{m23} & t_{my} \\ R_{m31} & R_{m32} & R_{m33} & t_{mz} \\ 0 & 0 & 0 & 1 \end{bmatrix} \begin{bmatrix} x_m \\ y_m \\ 0 \\ 1 \end{bmatrix} \quad (10)$$

Accordingly, as shown in Expression (11), F and G become functions regarding the camera position t, camera orientation $\omega$, position $t_m$ of a square marker, and orientation $\omega_m$ of a square marker.

$$F(t_x, t_y, t_z, \omega_x, \omega_y, \omega_z, t_{mx}, t_{my}, t_{mz}, \omega_{mx}, \omega_{my}, \omega_{mz}) = 0$$

$$G(t_x, t_y, t_z, \omega_x, \omega_y, \omega_z, t_{mx}, t_{my}, t_{mz}, \omega_{mx}, \omega_{my}, \omega_{mz}) = 0 \quad (11)$$

Expressions (9) and (11) are nonlinear expressions regarding the camera position and orientation, and the position and orientation of the marker. Accordingly, linearization is performed in the vicinity of the approximate values regarding the position and orientation of the camera, and the position and orientation of the marker using the Tayler expansion up to first order, and the position and orientation of the camera, and the position and orientation of the marker are obtained using repeated calculation.

Expressions (12) and (13) are obtained by linearizing the corresponding Expressions (9) and (11) respectively. Here, $\Delta t_x$, $\Delta t_y$, and $\Delta t_z$ represent the amount of correction for the approximate value of the position of the camera; $\Delta \omega_x$, $\Delta \omega_y$, and $\Delta \omega_z$ for the orientation of the camera; $\Delta x_w$, $\Delta y_w$ and $\Delta z_w$ for the position of the point marker; $\Delta t_{mx}$, $\Delta t_{my}$, and $\Delta t_{mz}$ for the position of the square marker; and $\Delta \omega_{mx}$, $\Delta \omega_{my}$, and $\Delta \omega_{mz}$ for the orientation of the square marker.

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \frac{\partial F}{\partial \omega_y}\Delta \omega_y + \qquad (12)$$
$$\frac{\partial F}{\partial \omega_z}\Delta \omega_z + \frac{\partial F}{\partial x_w}\Delta x_w + \frac{\partial F}{\partial y_w}\Delta y_w + \frac{\partial F}{\partial z_w}\Delta z_w = 0$$
$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y + $$
$$\frac{\partial G}{\partial \omega_z}\Delta \omega_z + \frac{\partial G}{\partial x_w}\Delta x_w + \frac{\partial G}{\partial y_w}\Delta y_w + \frac{\partial G}{\partial z_w}\Delta z_w = 0$$

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \qquad (13)$$
$$\frac{\partial F}{\partial \omega_y}\Delta \omega_y + \frac{\partial F}{\partial \omega_z}\Delta \omega_z + \frac{\partial F}{\partial t_{mx}}\Delta t_{mx} + \frac{\partial F}{\partial t_{my}}\Delta t_{my} + $$
$$\frac{\partial F}{\partial t_{mz}}\Delta t_{mz} + \frac{\partial F}{\partial \omega_{mx}}\Delta \omega_{mx} + \frac{\partial F}{\partial \omega_{my}}\Delta \omega_{my} + \frac{\partial F}{\partial \omega_{mz}}\Delta \omega_{mz} = 0$$
$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y + $$
$$\frac{\partial G}{\partial \omega_z}\Delta \omega_z + \frac{\partial G}{\partial t_{mx}}\Delta t_{mx} + \frac{\partial G}{\partial t_{my}}\Delta t_{my} + \frac{\partial G}{\partial t_{mz}}\Delta t_{mz} + $$
$$\frac{\partial G}{\partial \omega_{mx}}\Delta \omega_{mx} + \frac{\partial G}{\partial \omega_{my}}\Delta \omega_{my} + \frac{\partial G}{\partial \omega_{mz}}\Delta \omega_{mz} = 0$$

Here, $F^0$ and $G^0$ in Expressions (12) and (13) are constants, and represent the difference between the observation position $u_o$ and the projected position (calculated position) of the marker obtained when substituting the approximate values regarding the position and orientation of the camera, and the position of the point marker or the position and orientation of the square marker for F and G.

Expression (12) is an observation equation regarding one point marker observed on a certain image. Expression (13) is an observation equation regarding one vertex of a square marker observed on a certain image. In reality, multiple point markers or multiple square markers are observed on multiple images, so multiple Expressions (12) and (13) are obtained. Accordingly, the positions and orientations of the camera, the positions of the point markers, and the positions and orientations of the square markers are obtained by solving multiple Expressions (12) and (13) as simultaneous equations regarding the correction values as to the approximate values regarding the positions and orientations of the camera, the positions of the point markers, and the positions and orientations of the square markers.

Figure 7:
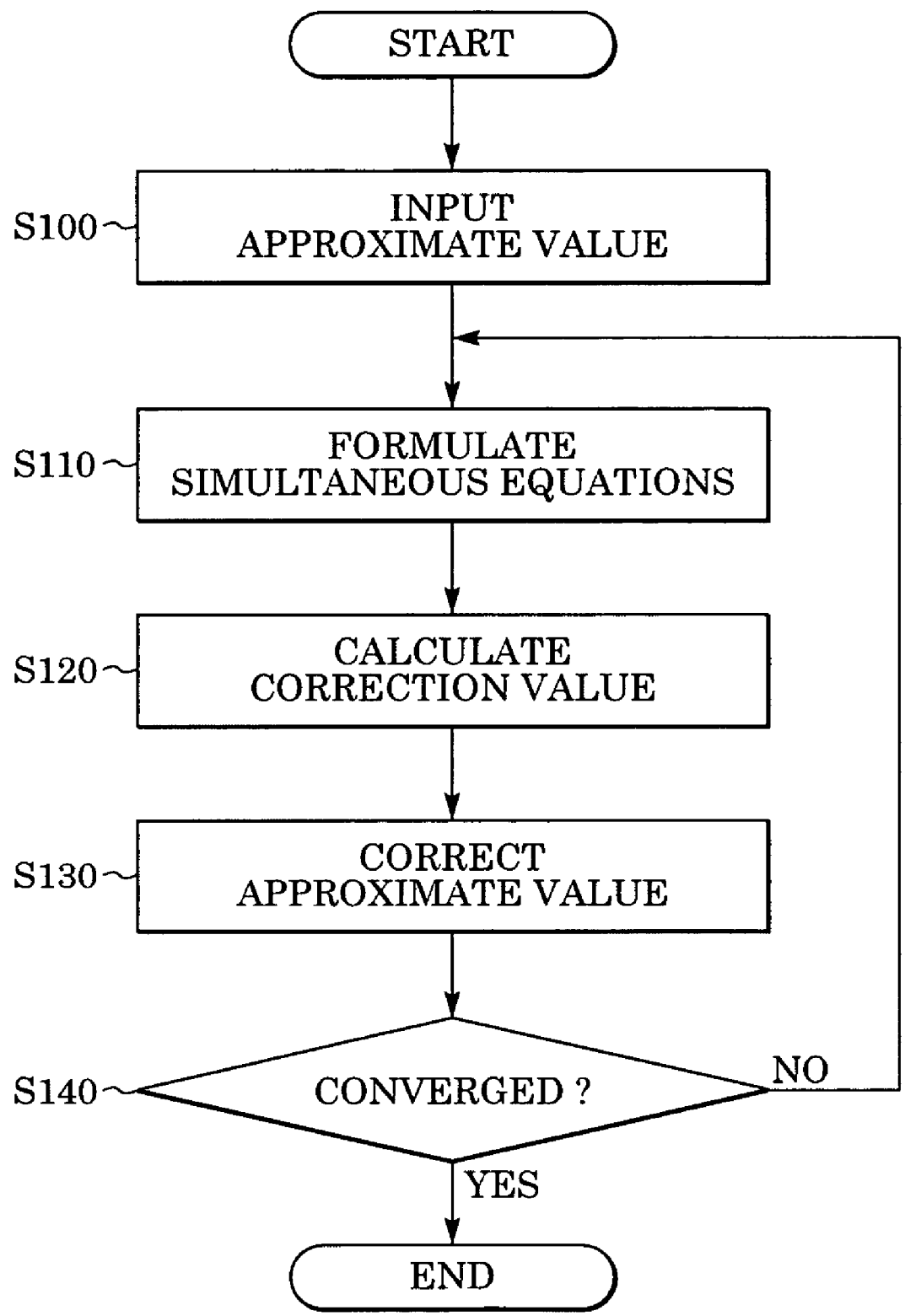
FIG. 7 is a flowchart illustrating procedures for obtaining the positions of point markers, and the positions and orientations of square markers, according to the first embodiment.

FIG. 7 is a flowchart illustrating procedures for obtaining the positions of point markers, and the positions and orientations of square markers according to the present embodiment. Now, let us say that photographing of scenes including markers and extraction and identification of the markers from photographed images have been completed. In Step S100, the approximate values regarding the positions and orientations of the cameras taking each image, the positions of the point markers, and the positions and orientations of the square markers are set. In the subsequent steps, correction values for correcting the approximate values set in Step S100 are obtained. In Step S110, formulation of simultaneous equations for simultaneously obtaining the correction value of each approximate value is performed so as to minimize the projection error based on the approximate values regarding the positions and orientations of the cameras, the positions of the point markers, and the positions and orientations of the square markers. In Step S120, the correction value of each approximate value is obtained from the simultaneous equations formulated in Step S110. In Step S130, new approximate values are obtained by correcting each approximate value with the corresponding correction value obtained in Step S120. In Step S140, determination is made as to whether or not the approximate values regarding the positions and orientations of the cameras, the positions of the point markers, and the positions and orientations of the square markers are converged to the optimized value in Step S130. If so, processing ends. If not, processing returns to Step S110 and processing of steps S110-S140 is repeated. More specific descriptions regarding each step are provided below.

In Step S100, the approximate values regarding the positions and orientations of the cameras taking the images, the positions of the point markers, and the positions and orientations of the square markers are input. Here, let us say that the number of images taken is N, the positions of the cameras taking each image are $t_i = [t_{ix}\ t_{iy}\ t_{iz}]^t$ (i=1, and so on through N), and the orientations thereof are $\omega_i = [\omega_{ix}\ \omega_{iy}\ \omega_{iz}]$ (i=1, and so on through N). Also, let us say that the number of the point markers of which the positions need to be obtained is $K_p$, and the positions of the respective point markers are $x_{wi} = [x_{wi}\ y_{wi}\ z_{wi}]^t$ (i=1, and so on through $K_p$). Further, let us say that the number of the square markers of which the positions and orientations need to be obtained is $K_s$, and the positions of the respective square markers are $t_{mi} = [t_{mix}\ t_{miy}\ t_{miz}]^t$ (i=1, and so on through $K_s$), and the orientations thereof are $\omega_{mi} = [\omega_{mix}\ \omega_{miy}\ \omega_{miz}]$ (i=1, and so on through $K_s$).

The approximate values of the position and orientation of each camera may be obtained from the output value of a 6-degree-of-freedom position and orientation sensor such as a magnetic sensor, which is mounted on the camera, or may be obtained from the correspondence between points of which the positions in the reference coordinate system are known, and the projected positions of the points on the image. In the case of employing a point of which the position in the reference coordinate system is known, both the point of which the position is known, and markers of which the positions to be obtained with the present embodiment are unknown are mixed in the scene. Alternately, the approximate values of the position and orientation of each camera may be obtained based on the later-described approximate values of the position and orientation of a marker.

Alternately, the approximate values of the position and orientation of each camera may be obtained mechanically, for example, with a motion control camera, or photographing with a camera of which the position and orientation have been calibrated beforehand may be performed so as to employ the calibration results.

The approximate values of the position and orientation of each marker may be a rough value measured by hand using a measuring tape, ruler, protractor, or surveying instrument, or may be a value estimated once using the method according to the present embodiment or the like.

Next, in Step S110, observation equations of Expressions (12) and (13) are formulated of a number corresponding to the number of the markers to be observed on the image. Expressions (12) and (13) are observation equations regarding the correction values of the position and orientation of one camera, and the correction value of the position of one point marker or the correction values of the position and orientation of one square marker. Here, as shown in Expression (14), an observation equation regarding the correction values of the positions and orientations of N cameras, the correction values of the positions of $K_p$ point markers, the correction values of the positions and orientations of $K_s$ square markers is formulated. In this case, the number of unknowns is $(6\times N+3\times K_p+6\times K_s)$.

$$F^0 + \sum_{i=1}^{N}\left(\frac{\partial F}{\partial t_{ix}}\Delta t_{ix} + \frac{\partial F}{\partial t_{iy}}\Delta t_{iy} + \right. \tag{14}$$

$$\frac{\partial F}{\partial t_{iz}}\Delta t_{iz} + \frac{\partial F}{\partial \omega_{ix}}\Delta\omega_{ix} + \frac{\partial F}{\partial \omega_{iy}}\Delta\omega_{iy} + \frac{\partial F}{\partial \omega_{iz}}\Delta\omega_{iz}\right) +$$

$$\sum_{i=1}^{K_p}\left(\frac{\partial F}{\partial x_{wi}}\Delta x_{wi} + \frac{\partial F}{\partial y_{wi}}\Delta y_{wi} + \frac{\partial F}{\partial z_{wi}}\Delta z_{wi}\right) +$$

$$\sum_{i=1}^{K_s}\left(\frac{\partial F}{\partial t_{mix}}\Delta t_{mix} + \frac{\partial F}{\partial t_{miy}}\Delta t_{miy} + \frac{\partial F}{\partial t_{miz}}\Delta t_{miz} + \right.$$

$$\left.\frac{\partial F}{\partial \omega_{mix}}\Delta\omega_{mix} + \frac{\partial F}{\partial \omega_{miy}}\Delta\omega_{miy} + \frac{\partial F}{\partial \omega_{miz}}\Delta\omega_{miz}\right) = 0$$

$$G^0 + \sum_{i=1}^{N}\left(\frac{\partial G}{\partial t_{ix}}\Delta t_{ix} + \frac{\partial G}{\partial t_{iy}}\Delta t_{iy} + \frac{\partial G}{\partial t_{iz}}\Delta t_{iz} + \frac{\partial G}{\partial \omega_{ix}}\Delta\omega_{ix} + \right.$$

$$\left.\frac{\partial G}{\partial \omega_{iy}}\Delta\omega_{iy} + \frac{\partial G}{\partial \omega_{iz}}\Delta\omega_{iz}\right) +$$

$$\sum_{i=1}^{K_p}\left(\frac{\partial G}{\partial x_{wi}}\Delta x_{wi} + \frac{\partial G}{\partial y_{wi}}\Delta y_{wi} + \frac{\partial G}{\partial z_{wi}}\Delta z_{wi}\right) +$$

$$\sum_{i=1}^{K_s}\left(\frac{\partial G}{\partial t_{mix}}\Delta t_{mix} + \frac{\partial G}{\partial t_{miy}}\Delta t_{miy} + \frac{\partial G}{\partial t_{miz}}\Delta t_{miz} + \right.$$

$$\left.\frac{\partial G}{\partial \omega_{mix}}\Delta\omega_{mix} + \frac{\partial G}{\partial \omega_{miy}}\Delta\omega_{miy} + \frac{\partial G}{\partial \omega_{miz}}\Delta\omega_{miz}\right) = 0$$

If we say that the number of point markers to be detected from an image i (i=1, and so on through N) is $d_{pi}$, and the number of square markers is $d_{si}$, the number $D_p$ of the point markers to be detected from the N images and the number $D_s$ of the square markers to be detected from the N images are represented as shown in Expression (15).

$$D_p = \sum_{i=1}^{N} d_{pi} \tag{15}$$

$$D_s = \sum_{i=1}^{N} d_{si}$$

In the case in which the number of the point markers to be detected from the N images is $D_p$, and the number of the square markers to be detected from the N images is $D_s$, $(D_p+4\times D_s)$ sets of observation equation (14), i.e., $2\times(D_p+4\times D_s)$ observation equation are formulated. If simultaneous equations are formulated by transposing the constant terms $F^0$ and $G^0$ on the left side of the Expression (14) to the right side thereof, the simultaneous equations are written in a matrix format as shown in Expression (16).

$$J\cdot\Delta = E \tag{16}$$

J is called a "Jacobian matrix" in which partial differential coefficients regarding the position and orientation of a camera, the position of a point marker, and the position and orientation of a square marker, of F and G are arrayed. The number of rows of the Jacobian matrix J is the number of the observation equations, i.e., $2\times(D_p+4\times D_s)$, the number of columns thereof is the number of unknowns, i.e., $(6\times N+3\times K_p+6\times K_s)$. $\Delta$ represents a correction vector. The size of the correction vector is the number of unknowns, i.e., $(6\times N+3\times K_p+6\times K_s)$. E represents an error vector, and has $-F_0$ and $-G_0$ which are the differences between the calculated position of the projected position due to the approximate value and the observation position. The size of E is the number of the observation equations, i.e., $2\times(D_p+4\times D_s)$.

Note that the origin, scale, and orientation of the reference coordinate system can be clearly specified by photographing point markers of which the positions are known or square markers of which the positions and orientations are known in the reference coordinate system simultaneously. In Expression (14), the partial differential coefficients regarding the positions and orientations of these markers become zero. In order to clearly specify the origin, scale, and orientation of the reference coordinate system, three point markers of which the positions are known, need to be employed in the case of point markers, or one square marker of which the position and orientation are known needs to be employed in the case of square markers.

Next, in Step S120, the correction values as to the approximate values regarding the positions and orientations of the cameras, the positions of the point markers, and the positions and orientations of the square markers, are obtained using Expression (16). In the case that the Jacobian matrix J is a square matrix, the correction value vector $\Delta$ is obtained by multiplying both sides of Expression (16) by the inverse matrix of the matrix J. In the case that the matrix J is not a square matrix, the correction value vector $\Delta$ is obtained using the least mean square method, as shown in Expression (17).

$$\Delta = (J^t\cdot J)^{-1}\cdot J^t\cdot E \tag{17}$$

Next, description is made regarding a method for obtaining each factor of the Jacobian matrix J. First, definition is made that $F=[F\ G]^t$. From Expressions (7) and (8), F and G can be written as shown in Expression (18), so F and G are functions of $x_c$, $y_c$, and $z_c$.

$$F = -f\frac{x_c}{z_c} - u_{ox} \tag{18}$$

$$G = -f\frac{y_c}{z_c} - u_{oy}$$

The Jacobian matrix $J_{Fx_c}$ of which each factor has a partial differential coefficient according to $x_c$, $y_c$, and $z_c$ of F and G, can be written as shown in Expression (19).

$$J_{Fx_c} = \begin{bmatrix} \frac{\partial F}{\partial x_c} & \frac{\partial F}{\partial y_c} & \frac{\partial F}{\partial z_c} \\ \frac{\partial G}{\partial x_c} & \frac{\partial G}{\partial y_c} & \frac{\partial G}{\partial z_c} \end{bmatrix} = \begin{bmatrix} -\frac{f}{z_c} & 0 & \frac{fx_c}{z_c^2} \\ 0 & -\frac{f}{z_c} & \frac{fy_c}{z_c^2} \end{bmatrix} \quad (19)$$

Here, if $x_c$, $y_c$, $z_c$ are the functions of variables $S_1$, $S_2$, and so on through $S_m$, F and G are also the functions of the variables $S_1$, $S_2$, and so on through $S_m$. The Jacobian matrix $J_{Fs}$ of which each factor has a partial differential coefficient according to S1, S2, and so on through Sm of F and G, can be decomposed as shown in Expression (20).

$$J_{Fs} = J_{Fx_c} \cdot J_{x_cs} = \begin{bmatrix} \frac{\partial F}{\partial x_c} & \frac{\partial F}{\partial y_c} & \frac{\partial F}{\partial z_c} \\ \frac{\partial G}{\partial x_c} & \frac{\partial G}{\partial y_c} & \frac{\partial G}{\partial z_c} \end{bmatrix} \begin{bmatrix} \frac{\partial x_c}{\partial s_1} & \frac{\partial x_c}{\partial s_2} & \cdots & \frac{\partial x_c}{\partial s_m} \\ \frac{\partial y_c}{\partial s_1} & \frac{\partial y_c}{\partial s_2} & \cdots & \frac{\partial y_c}{\partial s_m} \\ \frac{\partial z_c}{\partial s_1} & \frac{\partial z_c}{\partial s_2} & \cdots & \frac{\partial z_c}{\partial s_m} \end{bmatrix} \quad (20)$$

By substituting s with the camera position t, camera orientation ω, and point marker position $x_w$, the partial differential coefficients regarding the camera position, camera orientation, and point marker position, of F and G can be obtained.

The Jacobian matrix $J_{Ft}$ of which each factor has a partial differential coefficient according to the camera position $t_x$, $t_y$, and $t_z$ of F and G can be written as shown in Expression (21).

$$J_{Ft} = J_{Fx_c} \cdot J_{x_ct} \quad (21)$$

$$= J_{Fx_c} \cdot \begin{bmatrix} \frac{\partial x_c}{\partial t_x} & \frac{\partial x_c}{\partial t_y} & \frac{\partial x_c}{\partial t_z} \\ \frac{\partial y_c}{\partial t_x} & \frac{\partial y_c}{\partial t_y} & \frac{\partial y_c}{\partial t_z} \\ \frac{\partial z_c}{\partial t_x} & \frac{\partial z_c}{\partial t_y} & \frac{\partial z_c}{\partial t_z} \end{bmatrix}$$

$$= J_{Fx_c} \cdot \begin{bmatrix} -R_{11} & -R_{12} & -R_{13} \\ -R_{21} & -R_{22} & -R_{23} \\ -R_{31} & -R_{32} & -R_{33} \end{bmatrix}$$

Note that the relationship between the orientation ω and 3×3 rotation transform matrix R is as represented in Expression (5).

The Jacobian matrix $J_{Fω}$ of which each factor has a partial differential coefficient according to the camera orientations $ω_x$, $ω_y$, and $ω_z$ of F and G can be written in a decomposed manner as shown in Expression (22).

$$J_{Fω} = J_{Fx_c} \cdot J_{x_cω} = J_{Fx_c} \cdot J_{x_cR} \cdot J_{Rω} = J_{Fx_c} \cdot J_{x_cR} \cdot J_{Rr} \cdot J_{rω} \cdot J_{ωω} \quad (22)$$

Here, $J_{x_cR}$ is the Jacobian matrix as shown in Expression (23).

$$J_{x,R} = \begin{bmatrix} \frac{\partial x_c}{\partial R_{11}} & \frac{\partial x_c}{\partial R_{21}} & \frac{\partial x_c}{\partial R_{31}} & \frac{\partial x_c}{\partial R_{12}} & \frac{\partial x_c}{\partial R_{22}} & \frac{\partial x_c}{\partial R_{32}} & \frac{\partial x_c}{\partial R_{13}} & \frac{\partial x_c}{\partial R_{23}} & \frac{\partial x_c}{\partial R_{33}} \\ \frac{\partial y_c}{\partial R_{11}} & \frac{\partial y_c}{\partial R_{21}} & \frac{\partial y_c}{\partial R_{31}} & \frac{\partial y_c}{\partial R_{12}} & \frac{\partial y_c}{\partial R_{22}} & \frac{\partial y_c}{\partial R_{32}} & \frac{\partial y_c}{\partial R_{13}} & \frac{\partial y_c}{\partial R_{23}} & \frac{\partial y_c}{\partial R_{33}} \\ \frac{\partial z_c}{\partial R_{11}} & \frac{\partial z_c}{\partial R_{21}} & \frac{\partial z_c}{\partial R_{31}} & \frac{\partial z_c}{\partial R_{12}} & \frac{\partial z_c}{\partial R_{22}} & \frac{\partial z_c}{\partial R_{32}} & \frac{\partial z_c}{\partial R_{13}} & \frac{\partial z_c}{\partial R_{23}} & \frac{\partial z_c}{\partial R_{33}} \end{bmatrix} \quad (23)$$

$$= \begin{bmatrix} x_w - t_x & 0 & 0 & y_w - t_y & 0 & 0 & z_w - t_z & 0 & 0 \\ 0 & x_w - t_x & 0 & 0 & y_w - t_y & 0 & 0 & z_w - t_z & 0 \\ 0 & 0 & x_w - t_x & 0 & 0 & y_w - t_y & 0 & 0 & z_w - t_z \end{bmatrix}$$

Also, $J_{Rr}$ is the Jacobian matrix as shown in Expression (24).

$$J_{Rr} = \begin{bmatrix} \frac{\partial R_{11}}{\partial r_x} & \frac{\partial R_{11}}{\partial r_y} & \frac{\partial R_{11}}{\partial r_z} & \frac{\partial R_{11}}{\partial r_a} \\ \frac{\partial R_{21}}{\partial r_x} & \frac{\partial R_{21}}{\partial r_y} & \frac{\partial R_{21}}{\partial r_z} & \frac{\partial R_{21}}{\partial r_a} \\ \frac{\partial R_{31}}{\partial r_x} & \frac{\partial R_{31}}{\partial r_y} & \frac{\partial R_{31}}{\partial r_z} & \frac{\partial R_{31}}{\partial r_a} \\ \frac{\partial R_{12}}{\partial r_x} & \frac{\partial R_{12}}{\partial r_y} & \frac{\partial R_{12}}{\partial r_z} & \frac{\partial R_{12}}{\partial r_a} \\ \frac{\partial R_{22}}{\partial r_x} & \frac{\partial R_{22}}{\partial r_y} & \frac{\partial R_{22}}{\partial r_z} & \frac{\partial R_{22}}{\partial r_a} \\ \frac{\partial R_{32}}{\partial r_x} & \frac{\partial R_{32}}{\partial r_y} & \frac{\partial R_{32}}{\partial r_z} & \frac{\partial R_{32}}{\partial r_a} \\ \frac{\partial R_{13}}{\partial r_x} & \frac{\partial R_{13}}{\partial r_y} & \frac{\partial R_{13}}{\partial r_z} & \frac{\partial R_{13}}{\partial r_a} \\ \frac{\partial R_{23}}{\partial r_x} & \frac{\partial R_{23}}{\partial r_y} & \frac{\partial R_{23}}{\partial r_z} & \frac{\partial R_{23}}{\partial r_a} \\ \frac{\partial R_{33}}{\partial r_x} & \frac{\partial R_{33}}{\partial r_y} & \frac{\partial R_{33}}{\partial r_z} & \frac{\partial R_{33}}{\partial r_a} \end{bmatrix} = \begin{bmatrix} 2r_x(1-\cos r_a) & 0 & 0 & (r_x^2-1)\sin r_a \\ r_y(1-\cos r_a) & r_x(1-\cos r_a) & \sin r_a & r_x r_y \sin r_a + r_z \cos r_a \\ r_z(1-\cos r_a) & -\sin r_a & r_x(1-\cos r_a) & r_z r_x \sin r_a - r_y \cos r_a \\ r_y(1-\cos r_a) & r_x(1-\cos r_a) & -\sin r_a & r_x r_y \sin r_a - r_z \cos r \\ 0 & 2r_y(1-\cos r_a) & 0 & (r_y^2-1)\sin r_a \\ \sin r_a & r_z(1-\cos r_a) & r_y(1-\cos r_a) & r_y r_z \sin r_a + r_z \cos r_a \\ r_z(1-\cos r_a) & \sin r_a & r_x(1-\cos r_a) & r_z r_x \sin r_a + r_y \cos r_a \\ -\sin r_a & r_z(1-\cos r_a) & r_y(1-\cos r_a) & r_y r_z \sin r_a + r_x \cos r_a \\ 0 & 0 & 2r_z(1-\cos r_a) & (r_z^2-1)\sin r_a \end{bmatrix} \quad (24)$$

Also, if definition is made that $\omega=[\omega_x\ \omega_y\ \omega_z\ \theta]=[r_a r_x\ r_a r_y\ r_a r_z\ r_a]$, then $J_{r\omega}$ is the Jacobian matrix as shown in Expression (25).

$$J_? = \begin{bmatrix} \frac{\partial r_?}{\partial \omega_?} & \frac{\partial r_?}{\partial \omega_?} & \frac{\partial r_?}{\partial \omega_?} & \frac{\partial r_?}{\partial \theta} \\ \frac{\partial r_?}{\partial \omega_?} & \frac{\partial r_?}{\partial \omega_?} & \frac{\partial r_?}{\partial \omega_?} & \frac{\partial r_?}{\partial \theta} \\ \frac{\partial r_?}{\partial \omega_?} & \frac{\partial r_?}{\partial \omega_?} & \frac{\partial r_?}{\partial \omega_?} & \frac{\partial r_?}{\partial \theta} \\ \frac{\partial r_?}{\partial \omega_?} & \frac{\partial r_?}{\partial \omega_?} & \frac{\partial r_?}{\partial \omega_?} & \frac{\partial r_?}{\partial \theta} \end{bmatrix} \quad (25)$$

$$= \begin{bmatrix} \frac{1}{\theta} & 0 & 0 & -\frac{\omega_?}{\theta_?} \\ 0 & \frac{1}{\theta} & 0 & -\frac{\omega_?}{\theta_?} \\ 0 & 0 & \frac{1}{\theta} & -\frac{\omega_?}{\theta_?} \\ 0 & 0 & 0 & 1 \end{bmatrix}$$

Further, $J_{\omega\omega}$ is the Jacobian matrix as shown in Expression (26).

$$J_{\omega\omega} = \begin{bmatrix} \frac{\partial \omega_x}{\partial \omega_x} & \frac{\partial \omega_x}{\partial \omega_y} & \frac{\partial \omega_x}{\partial \omega_z} \\ \frac{\partial \omega_y}{\partial \omega_x} & \frac{\partial \omega_y}{\partial \omega_y} & \frac{\partial \omega_y}{\partial \omega_z} \\ \frac{\partial \omega_z}{\partial \omega_x} & \frac{\partial \omega_z}{\partial \omega_y} & \frac{\partial \omega_z}{\partial \omega_z} \\ \frac{\partial \theta}{\partial \omega_x} & \frac{\partial \theta}{\partial \omega_y} & \frac{\partial \theta}{\partial \omega_z} \end{bmatrix} \quad (26)$$

$$= \begin{bmatrix} 1 & 0 & 0 \\ 0 & 1 & 0 \\ 0 & 0 & 1 \\ \frac{\omega_x}{\theta} & \frac{\omega_y}{\theta} & \frac{\omega_z}{\theta} \end{bmatrix}$$

The Jacobian matrix $J_{Fx_w}$ Of which each factor has a partial differential coefficient according to the marker position $x_\omega$, $y_\omega$, and $z_\omega$ of F and G, can be written as shown in Expression (27).

$$J_{Fx_w} = J_{Fx_c} \cdot J_{x_c x_w} = J_{Fx_c} \cdot \begin{bmatrix} \frac{\partial x_c}{\partial x_w} & \frac{\partial x_c}{\partial y_w} & \frac{\partial x_c}{\partial z_w} \\ \frac{\partial y_c}{\partial x_w} & \frac{\partial y_c}{\partial y_w} & \frac{\partial y_c}{\partial z_w} \\ \frac{\partial z_c}{\partial x_w} & \frac{\partial z_c}{\partial y_w} & \frac{\partial z_c}{\partial z_w} \end{bmatrix} \quad (27)$$

$$= J_{Fx_c} \cdot \begin{bmatrix} R_{11} & R_{12} & R_{13} \\ R_{21} & R_{22} & R_{23} \\ R_{31} & R_{32} & R_{33} \end{bmatrix}$$

In the case of square markers, $x_w$ is a function of the position $t_m$ and orientation $\omega_m$, so F and G are also functions of $t_m$ and orientation $\omega_m$. The Jacobian matrix of which each factor has a partial differential coefficient according to the position $t_m$ of F and G can be decomposed as shown in Expression (28).

$$J_{Ft_m} = J_{Fx_c} \cdot J_{x_c x_w} \cdot J_{x_w t_m} = J_{Fx_c} \cdot J_{x_c x_w} \cdot \begin{bmatrix} \frac{\partial x_w}{\partial t_{mx}} & \frac{\partial x_w}{\partial t_{my}} & \frac{\partial x_w}{\partial t_{mz}} \\ \frac{\partial y_w}{\partial t_{mx}} & \frac{\partial y_w}{\partial t_{my}} & \frac{\partial y_w}{\partial t_{mz}} \\ \frac{\partial z_w}{\partial t_{mx}} & \frac{\partial z_w}{\partial t_{my}} & \frac{\partial z_w}{\partial t_{mz}} \end{bmatrix} \quad (28)$$

$$= J_{Fx_c} \cdot J_{x_c x_w} \cdot \begin{bmatrix} 1 & 0 & 0 \\ 0 & 1 & 0 \\ 0 & 0 & 1 \end{bmatrix}$$

The Jacobian matrix of which each factor has a partial differential coefficient according to the orientation $\omega_m$ of F and G can be decomposed as shown in Expression (29).

$$J_{F\omega_m} = J_{Fx_c} \cdot J_{x_c x_w} \cdot J_{x_w \omega_m} = J_{Fx_c} \cdot J_{x_c x_w} \cdot J_{x_w R_m} \cdot J_{R_m \omega_m} = \quad (29)$$

$$J_{Fx_c} \cdot J_{x_c x_w} \cdot \begin{bmatrix} x_m & 0 & 0 & y_m & 0 & 0 & 0 & 0 & 0 \\ 0 & x_m & 0 & 0 & y_m & 0 & 0 & 0 & 0 \\ 0 & 0 & x_m & 0 & 0 & y_m & 0 & 0 & 0 \end{bmatrix} \cdot J_{R_m \omega_m}$$

$J_{R_m \omega_m}$ can be obtained in the same way as Expressions (24) through (26).

Next, in Step S130, the approximate values regarding the camera positions and orientations, point marker positions, and square marker positions and orientations are corrected with the correction values obtained in Step S120. The positions and orientations of N cameras are corrected as shown in Expression (30).

$$t_{ix} = t_{ix} + \Delta t_{ix}$$

$$t_{iy} = t_{iy} + \Delta t_{iy}$$

$$t_{iz} = t_{iz} + \Delta t_{iz}$$

$$\omega_{ix} = \omega_{ix} + \Delta \omega_{ix}$$

$$\omega_{iy} = \omega_{iy} + \Delta \omega_{iy}$$

$$\omega_{iz} = \omega_{iz} + \Delta \omega_{iz}\ (i=1,2,\ldots,N) \quad (30)$$

Also, the positions of $K_p$ point markers are corrected as shown in Expression (31).

$$x_{wi} = x_{wi} + \Delta x_{wi}$$

$$y_{wi} = y_{wi} + \Delta y_{wi}$$

$$z_{wi} = z_{wi} + \Delta z_{wi}\ (i=1,2,\ldots,K_p) \quad (31)$$

Also, the positions and orientation of $K_s$ square markers are corrected as shown in Expression (32).

$$t_{mix} = t_{mix} + \Delta t_{mix}$$

$$t_{miy} = t_{miy} + \Delta t_{miy}$$

$$t_{miz} = t_{miz} + \Delta t_{miz}$$

$$\omega_{mix} = \omega_{mix} + \Delta \omega_{mix}$$

$$\omega_{miy} = \omega_{miy} + \Delta \omega_{miy}$$

$$\omega_{miz} = \omega_{miz} + \Delta \omega_{miz}\ (i=1,2,\ldots,K_s) \quad (32)$$

Next, in Step S140, convergence is determined. Determination of convergence is performed by determining a condition, e.g., whether or not the absolute value of the correction value is less than a specified threshold, whether or not the difference between the calculated position of the projected position and the observation position is less than a specified threshold, whether or not the difference between the calculated position of the projected position and the observation position becomes the minimum value, or the like. In the event that determination is made that convergence is satisfied, estimation of the positions and orientations of markers is completed, otherwise, the flow returns to Step S110, where simultaneous equations are formulated again based on the corrected approximate values regarding the positions and orientations of the cameras, the positions of the point markers, and the positions and orientations of the square markers.

Figure 8A:
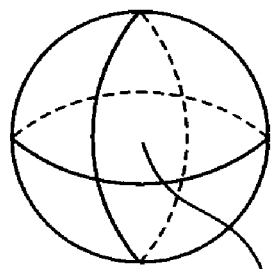
FIGS. 8A and 8B are diagrams illustrating a marker represented with the position of one point within 3-D space.
Figure 8B:
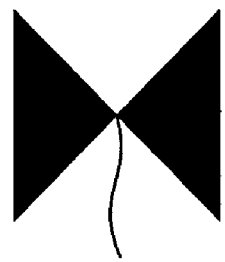

As described above, with the present embodiment, a great number of images of the scene in which markers are disposed are photographed, the markers are detected and identified from the photographed images, correction values corresponding to the approximate values regarding the positions and orientations of the cameras taking the images, the positions of the point markers, and the positions and orientations of the plane markers, are obtained based on the marker observed positions on the images simultaneously, and then the approximate values are corrected with the obtained correction values. This operating cycle for obtaining correction values corresponding to the approximate values and correcting the approximate values with the obtained correction values is repeated, thus obtaining the position of the point markers, and the positions and orientations of the square markers. Note that with the present embodiment, a point marker made up of a circular shape as a marker of which the placement information is represented with the position of one point within 3-D space has been employed, but the present invention is not restricted to this. For example, a spherical-shaped marker of which the surface is covered with a single color like that illustrated in FIG. 8A may be employed. In the case of such a sphere, the detection method is entirely the same as with the case of detecting a circular shape, and the barycentric position of the detected region should be taken as the position of the marker. Alternately, a 2-D pattern marker as illustrated in FIG. 8B may be employed. In this case, the position of the marker may be detected with a method in which binarized boundary edges are detected with an edge detection operator or the like, the obtained edge points are subjected to linear approximation, and then the intersecting points thereof are obtained. Further, natural characteristic points within space may be employed. In this case, an image near the natural characteristic point photographed beforehand is prepared as a template for example, and the correlation between the template and the real image is taken, and the position indicating high correlation can be detected as the position of the marker. With the aforementioned methods, the common feature is that the placement information is represented with the position of one point within 3-D space, so the aforementioned methods according to the present embodiment can be applied to such a marker of which the placement information is the position of one point alone.

Figure 9A:
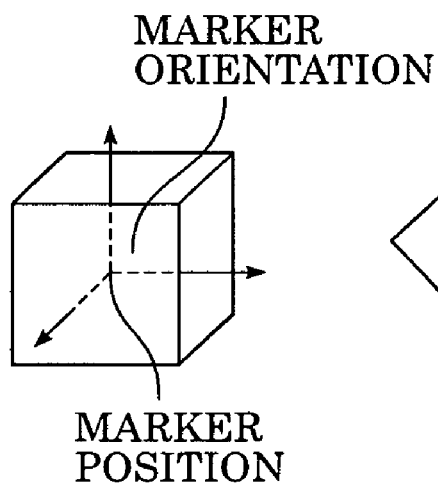
FIGS. 9A and 9B are diagrams illustrating a marker represented with a position and orientation within 3-D space.
Figure 9B:
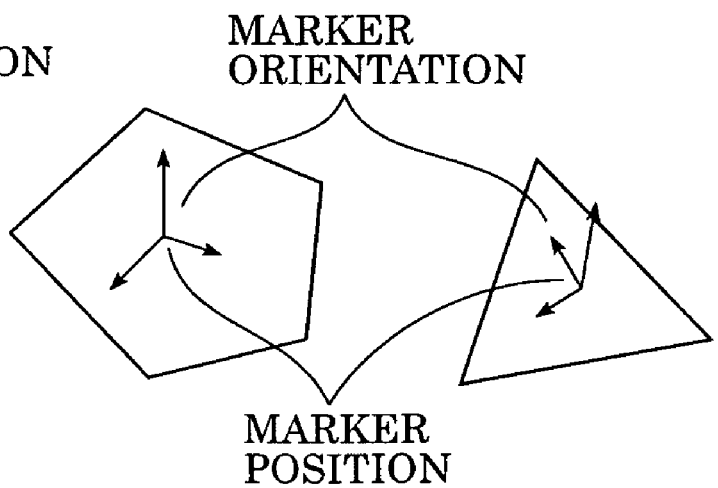

Also, with the present embodiment, a square marker has been employed as a marker of which the placement information is represented with the position and orientation within 3-D space, but the present invention is not restricted to this. For example, a cubic marker as illustrated in FIG. 9A may be employed. In the case of a cubic marker, the six side faces thereof are squares, so the same pattern as a square marker is disposed on each side face, and accordingly, the position of a marker may be detected with the same method as a method for detecting a square marker. In the event that a mass having a cubic shape is taken as a marker, the placement information of this marker is also represented with the position and orientation of the marker. Alternately, a polygon marker other than a square like that illustrated in FIG. 9B may be employed. As for the common property of the aforementioned markers, the placement information of any marker is represented with the position and orientation of the marker within 3-D space, to which the aforementioned methods described in the present embodiment can be applied.

Second Embodiment

With the first embodiment, the projection error (a sum of error between the calculated position of the projected position and the observed position) regarding point markers and the projection error of square markers are subjected to the least mean square method simultaneously by obtaining correction values regarding the positions of the point markers, and the positions and orientations of the square markers simultaneously, thus obtaining the positions of the point markers and the positions and orientations of the square markers accurately. With the second embodiment, the positions of point markers and the positions and orientations of square markers are obtained accurately by alternately repeating obtaining the positions of the point markers, and the positions and orientations of the square markers.

Figure 10:
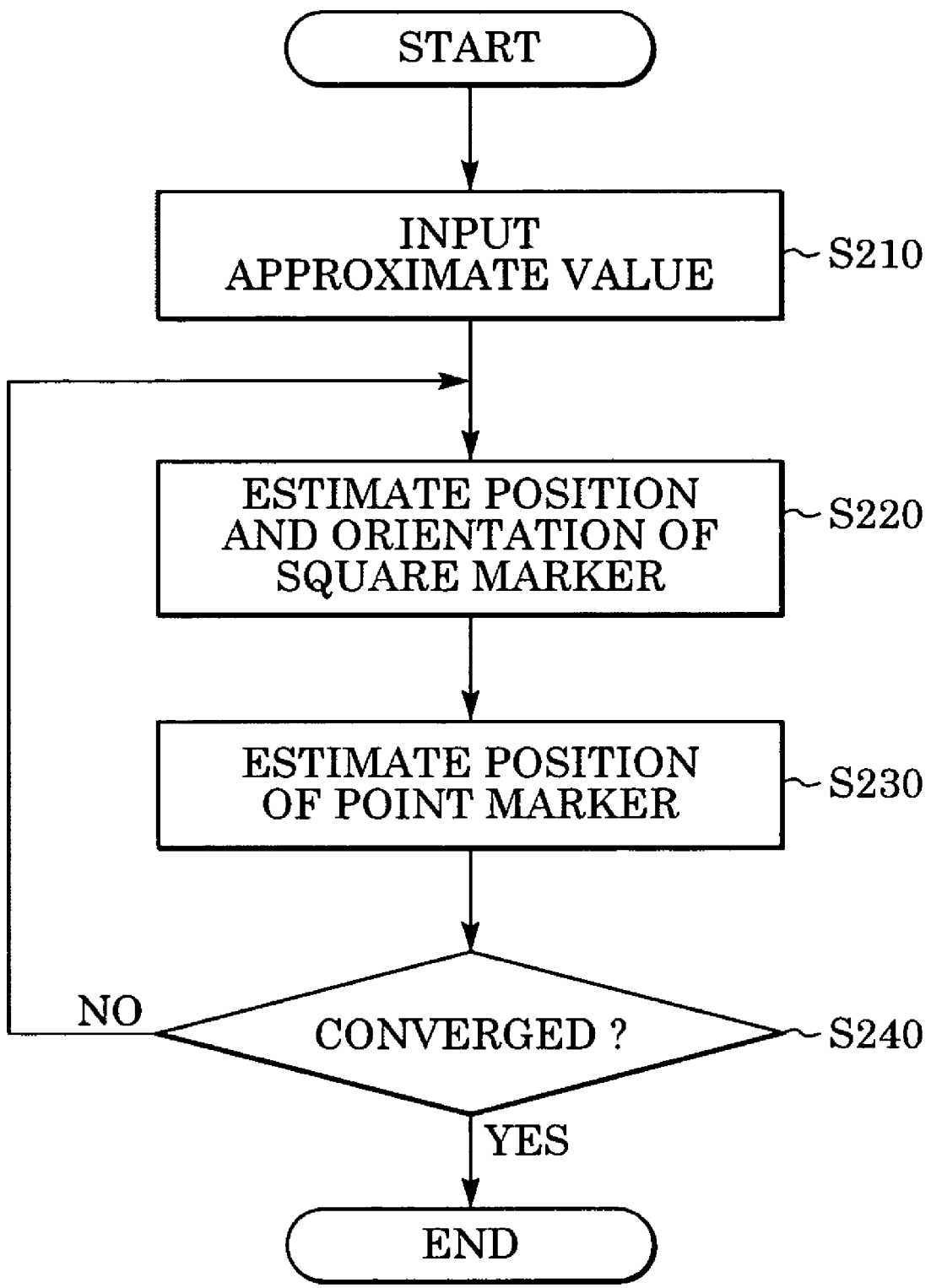
FIG. 10 is a flowchart illustrating procedures for obtaining the positions of point markers, and the positions and orientations of square markers, according to a second embodiment.

FIG. 10 is a flowchart illustrating procedures for obtaining the positions of point markers, and the positions and orientations of square markers according to the second embodiment. Let us say that photographing of scenes including markers and extraction and identification of the markers from photographed images have been completed. In Step S210, the approximate values regarding the positions and orientations of the cameras taking each image, the positions of the point markers, and the positions and orientations of the square markers are input. In Step S220, the positions and orientations of the cameras, and the positions and orientations of the square markers are obtained using the approximate values regarding the positions and orientations of the cameras, and positions and orientations of the square markers. In Step S230, the positions and orientations of the cameras, and the positions of the point markers are obtained using the approximate values of the positions of the point markers set in Step S210, and the positions and orientations of the cameras obtained in Step S220. In Step S240, determination is made whether or not the positions and orientations of the cameras, the positions of the point markers, and the positions and orientations of the square markers obtained in Steps S220 and S230 are converged in Step S240. More specific descriptions regarding each step are provided below.

In Step S210, the approximate values regarding the positions and orientations of the cameras taking each image, the positions of the point markers, and the positions and orientations of the square markers are input. Here, in the same way as the first embodiment, let us say that the number of the photographed images is N, the positions of the cameras taking each image are $t_i = [t_{ix}\ t_{iy}\ t_{iz}]^t$ (i=1, and so on through N), the orientations thereof are $\omega_i = [\omega_{ix}\ \omega_{iy}\ \omega_{iz}]$ (i=1, and so on through N). Also, let us say that the number of the point markers of which the positions need to be obtained is $K_p$, and the positions of the respective point markers are $x_{wi} = [x_{wi}\ y_{wi}\ z_{wi}]^t$ (i=1, and so on through $K_p$). Further, let us say that the number of the square markers of which the positions and orientations need to be obtained is $K_s$, and the positions of the respective square markers are $t_{mi} = [t_{mix}\ t_{miy}\ t_{miz}]^t$ (i=1, and so on through $K_s$), and the orientations thereof are $\omega_{mi} = [\omega_{mix}\ \omega_{miy}\ \omega_{miz}]$ (i=1, and so on through $K_s$).

Let us say that the approximate values regarding the positions and orientations of the cameras, and the positions and orientations of the markers are obtained using a method like that described in the first embodiment.

In Step S220, the positions and orientations of the square markers are obtained first. Here, as shown in Expression (33), an observation equation regarding the correction values of the positions and orientations of N cameras, the correction values of the positions and orientations of $K_s$ square markers is formulated as to each vertex of the square markers detected on the images. In this case, the number of unknowns is ($6 \times N + 6 \times K_s$)

$$F^0 + \sum_{i=1}^{N} \left( \frac{\partial F}{\partial t_{ix}} \Delta t_{ix} + \frac{\partial F}{\partial t_{iy}} \Delta t_{iy} + \right. \tag{33}$$

$$\frac{\partial F}{\partial t_{iz}} \Delta t_{iz} + \frac{\partial F}{\partial \omega_{ix}} \Delta \omega_{ix} + \frac{\partial F}{\partial \omega_{iy}} \Delta \omega_{iy} + \frac{\partial F}{\partial \omega_{iz}} \Delta \omega_{iz} \right) +$$

$$\sum_{i=1}^{K_s} \left( \frac{\partial F}{\partial t_{mix}} \Delta t_{mix} + \frac{\partial F}{\partial t_{miy}} \Delta t_{miy} + \frac{\partial F}{\partial t_{miz}} \Delta t_{miz} + \frac{\partial F}{\partial \omega_{mix}} \Delta \omega_{mix} + \right.$$

$$\left. \frac{\partial F}{\partial \omega_{miy}} \Delta \omega_{miy} + \frac{\partial F}{\partial \omega_{miz}} \Delta \omega_{miz} \right) = 0$$

$$G^0 + \sum_{i=1}^{N} \left( \frac{\partial G}{\partial t_{ix}} \Delta t_{ix} + \frac{\partial G}{\partial t_{iy}} \Delta t_{iy} + \frac{\partial G}{\partial t_{iz}} \Delta t_{iz} + \frac{\partial G}{\partial \omega_{ix}} \Delta \omega_{ix} + \right.$$

$$\left. \frac{\partial G}{\partial \omega_{iy}} \Delta \omega_{iy} + \frac{\partial G}{\partial \omega_{iz}} \Delta \omega_{iz} \right) +$$

$$\sum_{i=1}^{K_s} \left( \frac{\partial G}{\partial t_{mix}} \Delta t_{mix} + \frac{\partial G}{\partial t_{miy}} \Delta t_{miy} + \frac{\partial G}{\partial t_{miz}} \Delta t_{miz} + \frac{\partial G}{\partial \omega_{mix}} \Delta \omega_{mix} + \right.$$

$$\left. \frac{\partial G}{\partial \omega_{miy}} \Delta \omega_{miy} + \frac{\partial G}{\partial \omega_{miz}} \Delta \omega_{miz} \right) = 0$$

$F^0$ and $G^0$ are constant terms, and represent the difference between the projected position calculated from the approximate position of each vertex of the square marker and the real observed position. In the event that the number of the squares detected on the N images is $D_s$, the number of Expression (33) is $4 \times D_s$ sets, i.e., $8 \times D_s$ equations are formulated. The correction values corresponding to the approximate values regarding the positions and orientations of the N cameras, and the positions and orientations of the $K_s$ square markers are obtained by solving these $8 \times D_s$ simultaneous equations. The approximate values are corrected with the obtained correction values, and calculation of the correction values and correction of the approximate values are repeatedly performed until the positions and orientations of the cameras, and the positions and orientations of the square markers are converged.

Next, in Step S230, the positions of the point markers are obtained using the positions and orientations of the cameras obtained in Step S220 as approximate values. Here, as shown in Expression (34), an observation equation regarding the correction values of the positions and orientations of N cameras, the correction values of the positions of $K_p$ point markers is formulated as to the point markers detected on the images. In this case, the number of unknowns is ($6 \times N + 3 \times K_p$).

$$F^0 + \sum_{i=1}^{N} \left( \frac{\partial F}{\partial t_{ix}} \Delta t_{ix} + \frac{\partial F}{\partial t_{iy}} \Delta t_{iy} + \right. \tag{34}$$

-continued $$\left. \frac{\partial F}{\partial t_{iz}} \Delta t_{iz} + \frac{\partial F}{\partial \omega_{ix}} \Delta \omega_{ix} + \frac{\partial F}{\partial \omega_{iy}} \Delta \omega_{iy} + \frac{\partial F}{\partial \omega_{iz}} \Delta \omega_{iz} \right) +$$

$$\sum_{i=1}^{K_p} \left( \frac{\partial F}{\partial x_{wi}} \Delta x_{wi} + \frac{\partial F}{\partial y_{wi}} \Delta y_{wi} + \frac{\partial F}{\partial z_{wi}} \Delta z_{wi} \right) = 0$$

$$G^0 + \sum_{i=1}^{N} \left( \frac{\partial G}{\partial t_{ix}} \Delta t_{ix} + \frac{\partial G}{\partial t_{iy}} \Delta t_{iy} + \frac{\partial G}{\partial t_{iz}} \Delta t_{iz} + \right.$$

$$\left. \frac{\partial G}{\partial \omega_{ix}} \Delta \omega_{ix} + \frac{\partial G}{\partial \omega_{iy}} \Delta \omega_{iy} + \frac{\partial G}{\partial \omega_{iz}} \Delta \omega_{iz} \right) +$$

$$\sum_{i=1}^{K_p} \left( \frac{\partial G}{\partial x_{wi}} \Delta x_{wi} + \frac{\partial G}{\partial y_{wi}} \Delta y_{wi} + \frac{\partial G}{\partial z_{wi}} \Delta z_{wi} \right) = 0$$

$F^0$ and $G^0$ are constant terms, and represent the difference between the projected position calculated from the approximate position of the point marker and the real observed position. In the event that the total number of the point markers detected on the N images is $D_p$, the number of Expression (34) is $D_p$ sets, i.e., $2 \times D_p$ equations are formulated. The correction values corresponding to the approximate values regarding the positions and orientations of the N cameras, and the positions of the $K_p$ point markers are obtained by solving these $2 \times D_p$ simultaneous equations. The approximate values are corrected with the obtained correction values, and calculation of the correction values and correction of the approximate values are repeatedly performed until the positions and orientations of the cameras, and the positions the point markers are converged.

Next, in Step S240, a convergence test is performed using the positions and orientations of the square markers obtained in Step S220, and the positions and orientations of the cameras and the positions of the point markers obtained in Step S230. With the convergence test, determination is made that convergence is achieved when the average of the difference between the projected position and the real observed position is less than a threshold, for example. In this step, when determination is made that convergence is achieved, the processing ends, otherwise, the flow returns to Step S220.

As described above, the positions of point markers and the positions and orientations of square markers are obtained accurately by alternately repeating obtaining the positions and orientations of the square markers, and the positions of the point markers. Note that with description in the present embodiment, estimation of the positions and orientations of square markers has been performed prior to estimation of the positions of point markers, but estimation of the positions of point markers may be performed prior to estimation of the positions and orientations of square markers.

Also, as with the first embodiment, a point marker of which the placement information is represented with the position of one point within 3-D space is not restricted to a circular-shaped marker, so a marker having a shape like that illustrated in FIG. 8 may be employed. A marker of which the placement information is represented with the position and orientation within 3-D space is not restricted to a square marker, so a marker having a shape like that illustrated in FIG. 9 may be employed.

Third Embodiment

With the first and second embodiments, estimation of the positions and orientations of markers have been performed following the images of scenes including markers being photographed with the imaging device. With the third embodiment, estimation is performed based on the images stored in the storage device beforehand, thus performing offline processing.

Figure 11:
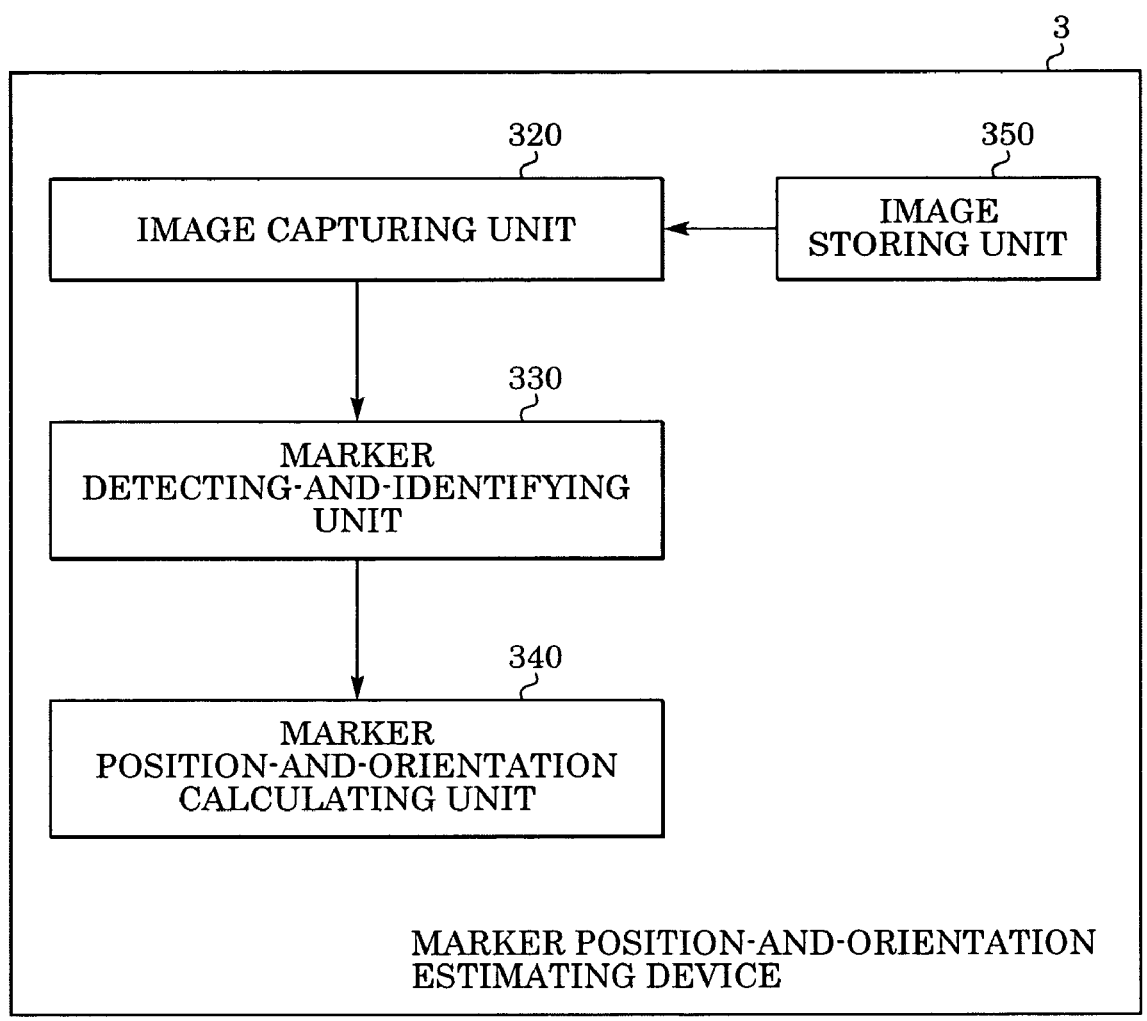
FIG. 11 is a block diagram illustrating the functional configuration of a marker position-and-orientation estimating device according to a third embodiment.

FIG. 11 is a block diagram illustrating the functional configuration of a marker position-and-orientation estimating device 3 according to the third embodiment. The marker position-and-orientation estimating device 3 includes an image storing unit 350, image capturing unit 320, marker detecting-and-identifying unit 330, and marker position-and-orientation calculating unit 340. Description is made below regarding the procedures of marker position-and-orientation estimation in the marker position-and-orientation estimating device 3.

(1. Capturing of Images)

N images of scenes including markers are photographed beforehand, and are stored in the image storing unit 350. The image capturing unit 320 reads out the N images from the image storing unit 350, and transmits these to the marker detecting-and-identifying unit 330.

(2. Detection and Identification of Markers)

The marker detecting-and-identifying unit 330 performs detecting and identifying of the photographed images read out by the image capturing unit 320. Detection of point markers is performed by obtaining the center of gravity of each point marker region on a 2-D image, and detection of square markers is performed by obtaining each vertex of each square marker on a 2-D image. Detection of markers may be performed manually or automatically. Following detection of markers, the detected markers are identified.

(3. Estimation of the Position and Orientation of a Marker)

Processing is repeatedly performed in which the approximate values regarding the positions and orientations of cameras, and the positions and orientations of markers are given using the method described in the first and second embodiments, the correction values corresponding to the approximate values are obtained, and the approximate values are corrected with the obtained correction values, thus obtaining the positions and orientations of the cameras, and the positions and orientations of the markers.

Figure 12:
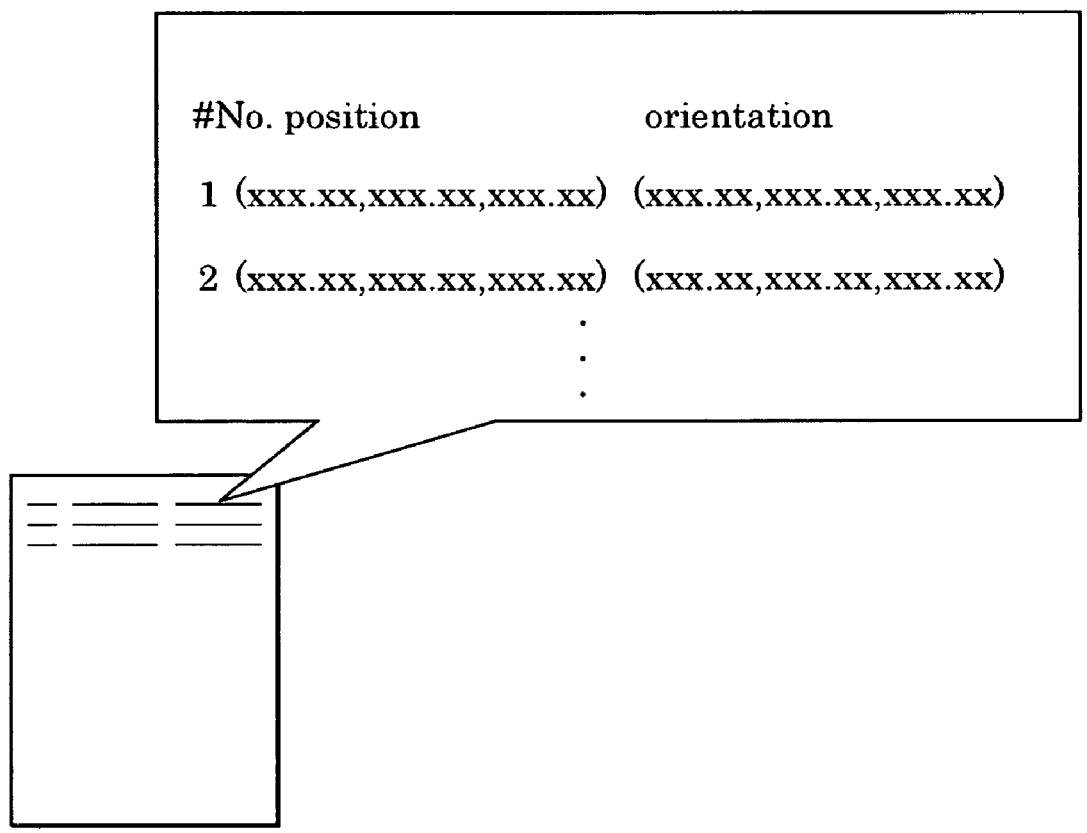
FIG. 12 is a diagram illustrating an example of a camera position-and-orientation data file format.

As for the approximate values of the positions and orientations of cameras, an arrangement can be made in which a 6-degree-of-freedom position-and-orientation sensor is mounted on a camera when photographing images, the output values from the sensor are stored in a file as camera position-and-orientation data at the time of photographing simultaneously, and the values read out from the file are employed at the time of estimating the positions and orientations of markers. FIG. 12 illustrates an example of a camera position-and-orientation data file format. Let us say that the first line attached with # on the head thereof is a comment line. Camera position-and-orientation data is included in the second line and the subsequent lines. First, the ID No. of a photographed image is described. This ID No. is correlated with the file name of a photographed image, for example, in the event that a photographed image is stored in the JPEG format, the file name of a photographed image having the ID No. 0 is named with 000000.jpg, and the file name of a photographed image having the ID No. 1 is named with 000001.jpg. Following the ID No., position data and orientation data are described in parenthesis, respectively. Note that the output values of the 6-degree-of-freedom position-and-orientation sensor have been employed here, but are not restricted to this, any value may be employed as long as the value is included in the approximate values and the positions and orientations of cameras.

Also, with the present embodiment, image capturing is all performed by readout from the image storing unit, but not only the images photographed beforehand but also images newly photographed with a photographing device may be employed.

As described above, with the third embodiment, estimation of the positions and orientations of markers is performed based on the images stored in the storage device beforehand, thus performing offline estimation of the positions and orientations of markers.

Fourth Embodiment

With the fourth embodiment, output of a marker data file is performed using the marker position-and-orientation estimating system including a marker position-and-orientation device described in the first through third embodiments.

Figure 13:
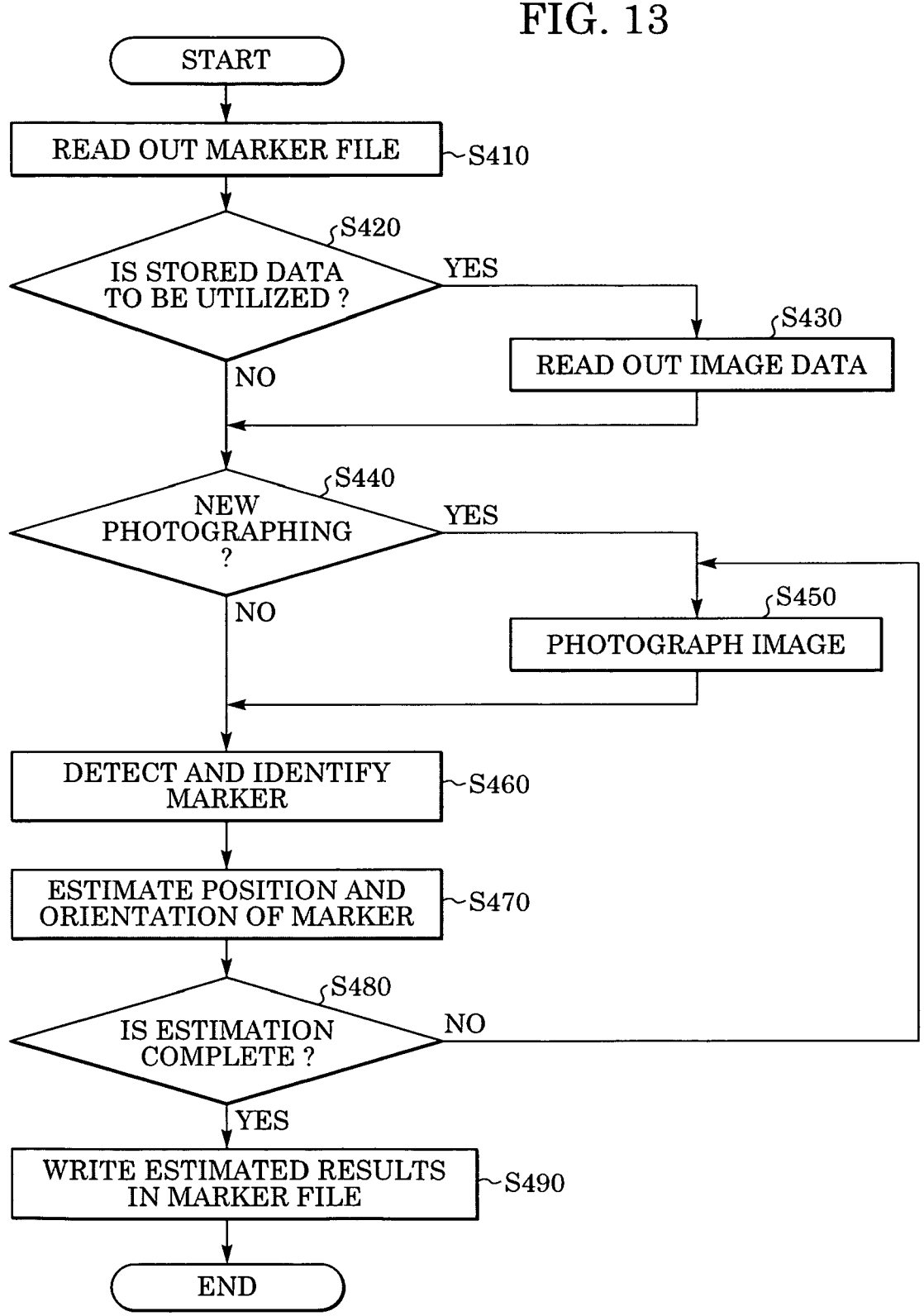
FIG. 13 is a flowchart illustrating the processing procedures of a marker position-and-orientation estimating system according to a fourth embodiment.

FIG. 13 is a flowchart illustrating the processing procedures of a marker position-and-orientation estimating system according to the fourth embodiment. In Step S410, a marker file that describes the list of markers of which the placement information needs to be estimated is read out. In Step S420, determination is made as to whether or not an image already photographed and stored is to be employed. If so, in Step S430, an image already photographed and stored is read out. In Step S440, determination is made as to whether or not a new image is to be photographed with an imaging device. If so, in Step S450, photographing a scene including markers is performed with the imaging device. In Step S460, detection and identification of markers are performed based on the images read out from the storage device or the images photographed with the imaging device. In Step S470, estimation of the positions and orientations of markers is performed based on the detection results of markers. In Step S480, determination is made as to whether or not estimation of the positions and orientations of markers is complete. If it is determined that estimation of the positions and orientations of markers is complete, then in Step S490, estimation results of the positions and orientations of markers are written out in a file and processing ends. On the other hand, if it is determined in Step S480 that estimation of the positions and orientations of markers is not complete, processing returns to step S450. More specific descriptions regarding each step are provided below.

Figure 14:
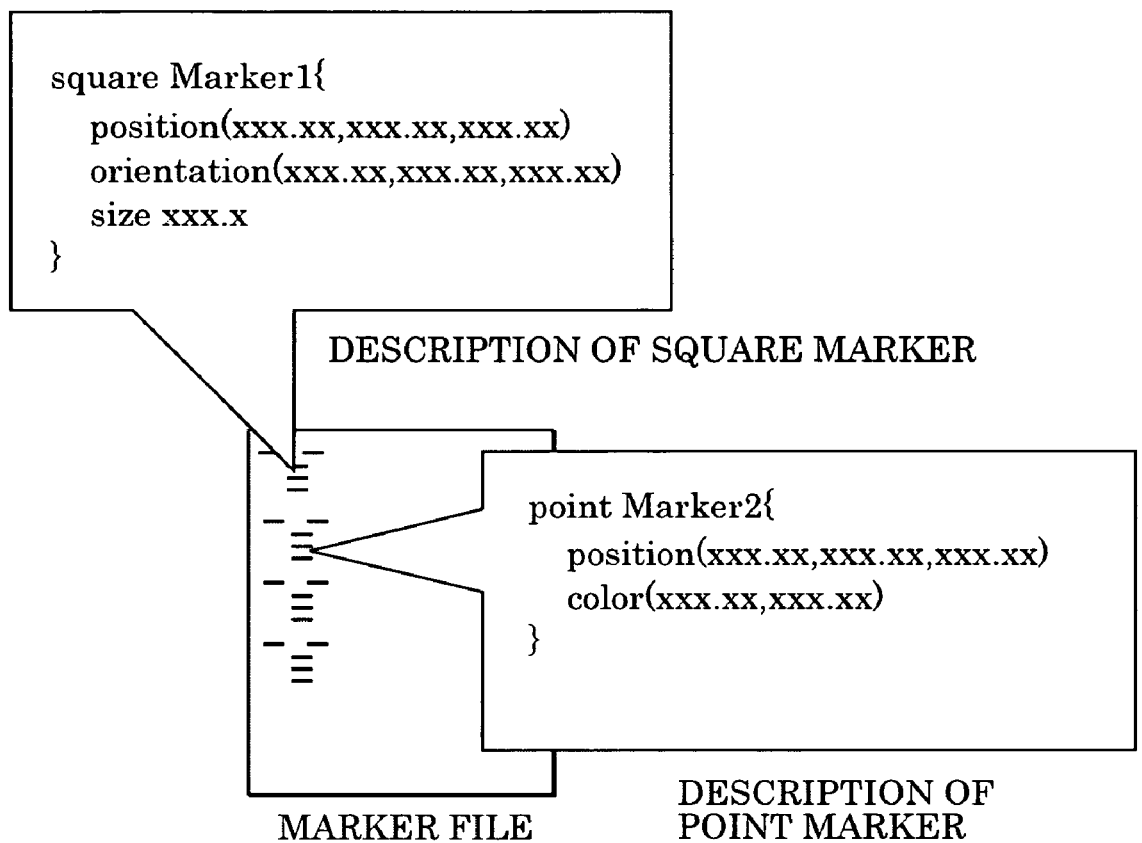
FIG. 14 is a diagram illustrating an example of a marker file format.

First, in Step S410, readout of a marker file is performed. This marker file includes descriptions regarding the unique name of each marker of which the position and orientation need to be estimated, a marker type (here, point marker or square marker), one side length in the case that each marker is a square marker, a marker color in the case that each marker is a point marker, and the approximate values corresponding to the position and orientation of each marker. FIG. 14 illustrates an example of a marker file format. With the marker file in FIG. 14, the type of a marker is provided followed by the name of the marker. "Square" in FIG. 14 represents a square marker, and "point" represents a point marker. The description of each marker is surrounded with parentheses. In the case of square markers, the approximate value of the position of a marker is described in the field "position", the approximate value of the orientation of a marker is described in the field "orientation", and length of one side of a square is described in the field "size". In the case of point markers, the approximate value of the position of a marker is described in the field "position", and the color of a marker is described in the field "color". As for the color of a marker, U and V components are described in the case of representing a color with YUV space, for example. Color space is not limited to YUV and any color space can be used.

Next, in Step S420, determination is made as to whether or not the user utilizes the data already photographed and stored. In the case that the data already photographed is unavailable, or in the case that the user does not utilize the data already photographed, the flow proceeds to Step S440. In the case that the user utilizes the data already photographed, the flow proceeds to Step S430, where readout of an image file is performed. When reading out an image file, the corresponding camera position-and-orientation data file at the time of photographing as described in the third embodiment is read simultaneously in the event that the file is available.

In Step S440, determination is made as to whether or not photographing is performed anew. In the case of performing new photographing, the flow proceeds to Step S450, and photographing of a scene including markers is performed. In the case that the approximate values regarding the position and orientation of a camera can be obtained from a 6-degree-of-freedom position-and-orientation sensor mounted on the camera, or the like, the approximate values are simultaneously obtained here.

Next, in Step S460, markers are detected from the photographed images and the readout images, and matching (identification) of each detected marker as to the corresponding marker described in the marker file read out in Step S410 is performed. In Step S460, determination is also made as to whether or not each image is used for estimation of the positions and orientations of markers as well as detection and identification of markers.

When detection and identification of markers is completed, estimation of the positions and orientations of markers is performed in Step S470. The specific estimating method is the same as described in the first and second embodiments. When estimation of the positions and orientations of markers is completed, the flow proceeds to Step S480, where determination is made as to whether or not the user wants to end estimation of the positions and orientations. In the case that the user cannot satisfy the estimation results, the flow returns to Step S450, where image photographing is performed newly, and then estimation is performed again. In the case of the user satisfying the estimation results, the flow proceeds to Step S490, where the data used in the estimation of positions and orientations of markers is written out as a marker file in a file format, such as that the one illustrated in FIG. 14. The MR application user utilizes the marker file written out in Step S490 for registration of virtual space and real space.

As described above, with the fourth embodiment, output of the marker data file to be utilized for registration in an MR application is performed using the marker position-and-orientation estimating system including a marker position-and-orientation device described in the first through third embodiments.

Fifth Embodiment

With the fifth embodiment, regarding various types of markers of which the amount of the placement information is different, the placement information of various types of markers is obtained by changing weight for each type of marker. Accuracy regarding the placement information of various types of markers is improved by giving heavier weight to markers having higher reliability of detected results from an image.

With the present embodiment, description will be made regarding the case of employing two types of marker, i.e., a point marker and square marker. As for the observed position of point markers having a circular shape as illustrated in FIG. 4A on an image, the center of gravity of a circular region on the image is employed. However, the center of gravity on an image does not always match the center of gravity of a circular region in 3-D space. Accordingly, the reliability of the detected position on an image deteriorates. On the other hand, in the case of square markers, the projected position of each vertex is employed as the observed position on an image as they are, so the reliability of the detected position on an image is high. With the first embodiment, Expression (16) has been employed to obtain the positions of point markers, and the positions and orientations of square markers. Here, Expression (16) is shown again as Expression (35).

$$J \cdot \Delta = E \quad (35)$$

Contribution to the detected results of square markers can be increased as compared with point markers by changing Expression (35) so as to give a lighter weight to the detected results of point markers and a heavier weight to the detected results of square markers at the time of obtaining the positions and orientations of markers. Now, let us define a weighting matrix W as shown in Expression (36).

$$W = \begin{bmatrix} w_1 & 0 & 0 & 0 \\ 0 & w_2 & 0 & \\ 0 & 0 & \ddots & \\ & & & \ddots \end{bmatrix} \quad (36)$$

The weighting matrix W is a diagonal matrix. As shown in Expression (37), both sides of Expression (35) are multiplied by this weighting matrix W.

$$WJ\Delta = WE \quad (37)$$

With each line of both sides of Expression (35), each element of the weighting matrix W is set so as to give a lighter weight to the line of a point marker and to give a heavier weight to the line of a square marker. When a matrix (W·J) is a square matrix, a correction vector $\Delta$ is obtained using the least mean square method as shown in Expression (38), otherwise, as shown in Expression (39).

$$\Delta = (WJ)^{-1} WE \quad (38)$$

$$\Delta = ((WJ)^t (WJ))^{-1} (WJ)^t WE \quad (39)$$

As described above, regarding various types of markers of which the amount of the placement information is different, the placement information of various types of markers is obtained by giving heavier weight to markers having higher reliability of detected results from an image, thus improving precision regarding the placement information of various types of markers.

Also, a method for stabilizing calculation by dynamically changing this weight matrix W based on the difference of effects that each marker affects the correcting values of parameters is known technology, and a combination with such a method may be employed. Modification With the first embodiment, a method for subjecting observation equations to Taylor expansion, and repeating correction with up to first order has been described as a method for correcting marker placement information. This is a method for estimating the amount of correction of unknown parameters in the case of assuming that observation equations are subjected to linearization locally in one process of repetition, and result in no error, and is a method equivalent to a method called the Newton method. The Newton method is a typical method for solving a nonlinear equation using numerical computation, but a repeated calculation method used for the present embodiment is not restricted to this. For example, the amount of correction may be dynamically changed based on the variance of the amount of correction of an unknown parameter to be estimated in one process, such as the Levenberg-Marquardt method. Alternately, a method for performing repeated calculation in light of the results of Taylor expansion including higher order terms may be employed. The essence of the present invention is for obtaining the most appropriate solution using various types of markers even in the event that multiple types of markers having different placement information are mixed, therefore the essence of the present invention is never lost by a specific method for repeated calculation serving as a numerical solution.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-144782 filed May 14, 2004, which is hereby incorporated by reference herein.

What is claimed is:

1. A marker placement information estimating method for estimating placement information of a plurality of types of markers, the marker placement information estimating method comprising:

using a processor to carry out the method of:

a marker detecting step for detecting a plurality of types of markers, of which the placement information has different amounts of information, from multiple images in which scenes including markers are photographed, the plurality of types of markers including a first marker type of which the placement information is described with the position of one point within 3-D space, and a second marker type of which the placement information is described with the position and orientation within 3-D space;

a marker projected position calculating step for calculating a projected position where a marker is projected on an image surface based on an approximate value of the position and orientation of an imaging unit when the multiple images were photographed and an approximate value of the placement information of each type of marker;

a correction value calculating step for obtaining a correction value as to the placement information of each type of marker so as to reduce a sum of error between the position of each type of marker on the image surface detected in the marker detecting step and the projected position of the marker on the image surface obtained in the marker projected position calculating step;

a placement information correcting step for correcting an arrangement of each type of marker based on the correction value obtained in the correction value calculating step; and a repeated calculating step for calculating the placement information of each type of marker by repeatedly performing the marker projected position calculating step, the correction value calculating step, and the placement information correcting step using the placement information of the marker corrected in the placement information correcting step instead of the approximate value of the marker projected position calculating step.

2. The marker placement information estimating method according to claim 1, wherein the correction value calculating step obtains a correction value corresponding to the placement information of each type of marker by giving a different weight for each type of marker.

3. The marker placement information estimating method according to claim 1, wherein the second marker type is a plane polygon region of which the color or brightness is different from the surroundings, and is a polygon marker that can be detected by obtaining the perimeter shape thereof from an image.

4. The marker placement information estimating method according to claim 1, further comprising a step for outputting the marker placement information of the estimated marker to a file.

5. A computer-readable medium storing a program for realizing the marker placement information estimating method according to claim 1 using a computer.

6. A marker placement information estimating method for estimating placement information of a plurality of types of markers, the marker placement information estimating method comprising:

using a processor to carry out the method of:

a marker detecting step for detecting a plurality of types of markers, of which the placement information has different amounts of information, from multiple images in which scenes including markers are photographed, the plurality of types of markers including a first marker type of which the placement information is described with the position of one point within 3-D space, and a second marker type of which the placement information is described with the position and orientation within 3-D space;

a marker type selecting step for selecting one or more types of marker from the plurality of types of markers;

a marker projected position calculating step for calculating a position where a marker is projected on an image surface based on an approximate value of the position and orientation of an imaging unit when the multiple images were photographed and an approximate value of the placement information of the marker having the type selected in the marker type selecting step;

a placement information correcting step for obtaining the placement information of the selected types of marker so as to reduce a sum of error between the position on the image surface of the marker, which has been detected in the marker detecting step, having the type selected in the marker type selecting step and the projected position on the image surface of the marker obtained in the marker projected position calculating step, and correcting the placement information;

a first repeated calculating step for calculating the placement information of the marker corrected in the placement information correcting step by repeatedly performing the marker projected position calculating step and the placement information correcting step using the placement information of the marker corrected in the placement information correcting step instead of the approximate value of the marker projected position calculating step; and a second repeated calculating step for selecting one or more markers having the type not selected in the marker type selecting step again, and repeatedly performing the marker projected position calculating step, the placement information correcting step, and the first repeated calculating step.

7. The marker placement information estimating method according to claim 6, wherein the second marker type is a plane polygon region of which the color or brightness is different from surroundings, and is a polygon marker that can be detected by obtaining the perimeter shape thereof from an image.

8. The marker placement information estimating method according to claim 6, further comprising a step for outputting the marker placement information of the estimated marker to a file.

9. A computer-readable medium storing a program for realizing the marker placement information estimating method according to claim 6 using a computer.

10. An information processing device for estimating placement information of a plurality of types of markers, the information processing device comprising:
   an imaging unit for, upon instruction by a user, capturing a plurality of images of a scene having a plurality of markers, the plurality of types of markers including a first marker type of which the placement information is described with the position of one point within 3-D space, and a second marker type of which the placement information is described with the position and orientation within 3-D space;
   an image capturing unit for inputting the plurality of images of the scene having the plurality of markers captured by the imaging unit;
   a marker detecting unit adapted to detect a plurality of types of markers, of which the placement information has different amounts of information, from the plurality of images input by the image capturing unit;
   a marker projected position calculating unit adapted to calculate a position where a marker is projected on an image surface based on an approximate value of the position and orientation of an imaging unit when the multiple images were photographed and an approximate value of the placement information of each type of marker;
   a correction value calculating unit adapted to obtain a correction value as to the placement information of each type of marker so as to reduce a sum of error between the position of each type of marker on the image surface detected by the marker detecting unit and the projected position of the marker on the image surface obtained by the marker projected position calculating unit;
   a placement information correcting unit adapted to correct an arrangement of each type of marker based on the correction value obtained by the correction value calculating unit; and
   a repeated calculating unit adapted to calculate the placement information of each type of marker by repeatedly performing the processing at the marker projected position calculating unit, the processing at the correction value calculating unit, and the processing at the placement information correcting unit using the placement information of the marker corrected by the placement information correcting unit instead of the approximate value of the marker projected position calculating unit.

11. An information processing device for estimating placement information of a plurality of types of markers, the information processing device comprising:
   an imaging unit for, upon instruction by a user, capturing a plurality of images of a scene having a plurality of markers, the plurality of types of markers including a first marker type of which the placement information is described with the position of one point within 3-D space, and a second marker type of which the placement information is described with the position and orientation within 3-D space:
   an image capturing unit for inputting the plurality of images of the scene having the plurality of markers captured by the imaging unit;
   a marker detecting unit adapted to detect a plurality of types of markers, of which the placement information has different amounts of information, from plurality of images input by the image capturing unit;
   a marker type selecting unit adapted to select one or more types of marker from the plurality of types of markers;
   a marker projected position calculating unit adapted to calculate a projected position where a marker is projected on an image surface based on an approximate value of the position and orientation of an imaging unit when the multiple images were photographed and an approximate value of placement information of the marker having the type selected by the marker type selecting unit;
   a placement information correcting unit adapted to obtain placement information of the selected types of marker so as to reduce a sum of error between the position on the image surface of the marker, which has been detected by the marker detecting unit, having the type selected by the marker type selecting unit and the projected position on the image surface of the marker obtained by the marker projected position calculating unit, and correcting the placement information;
   a first repeated calculating unit adapted to calculate the placement information of the marker corrected by the placement information correcting unit by repeatedly performing processing at the marker projected position calculating unit and processing at the placement information correcting unit using the placement information of the marker corrected by the placement information correcting unit instead of the approximate value of the marker projected position calculating unit; and
   a second repeated calculating unit adapted to select one or more markers having the type not selected by the marker type selecting unit again, and repeatedly performing processing at the marker projected position calculating unit, processing at the placement information correcting unit, and processing at the first repeated calculating unit.

* * * * *